(12) United States Patent
Ota et al.

(10) Patent No.: US 7,649,713 B2
(45) Date of Patent: Jan. 19, 2010

(54) THIN-FILM MAGNETIC HEAD WITH HEATING ELEMENT AND HEATSINK

(75) Inventors: Norikazu Ota, Tokyo (JP); Katsuki Kurihara, Tokyo (JP); Hiraku Hirabayashi, Tokyo (JP); Taro Oike, Tokyo (JP); Hiroki Matsukuma, Tokyo (JP)

(73) Assignee: TDK Corporation, Tokyo (JP)

( * ) Notice: Subject to any disclaimer, the term of this patent is extended or adjusted under 35 U.S.C. 154(b) by 760 days.

(21) Appl. No.: 11/334,009

(22) Filed: Jan. 18, 2006

(65) Prior Publication Data
US 2006/0291098 A1 Dec. 28, 2006

(30) Foreign Application Priority Data
Jun. 28, 2005 (JP) .............................. 2005/188017

(51) Int. Cl.
G11B 5/127 (2006.01)
(52) U.S. Cl. ................................. 360/125.32
(58) Field of Classification Search ............ 360/125.31, 360/125.32, 125.74, 125.75
See application file for complete search history.

(56) References Cited
U.S. PATENT DOCUMENTS 5,991,113 A 11/1999 Meyer et al. .................. 360/75
7,224,553 B2* 5/2007 Sasaki et al. ................. 360/128
7,391,590 B2* 6/2008 Matono et al. .......... 360/125.32
7,428,124 B1* 9/2008 Song et al. ................... 360/128
7,542,243 B2* 6/2009 Lou et al. ................. 360/294.7
2003/0099054 A1 5/2003 Kamijima ..................... 360/59
2003/0174430 A1 9/2003 Takahashi et al. ............. 360/75
2004/0017638 A1 1/2004 Sato ........................... 360/126
2004/0027719 A1 2/2004 Gider et al. ................. 360/128
2004/0201920 A1* 10/2004 Koide et al. ................. 360/128
2005/0225897 A1* 10/2005 Liu et al. .................... 360/126

FOREIGN PATENT DOCUMENTS

| JP | 2001-236614 | 8/2001 |
|----|-------------|--------|
| JP | 2001-283403 A | 10/2001 |
| JP | 2004-5775 | 1/2004 |
| JP | 2004-259379 | 9/2004 |
| JP | 3632025 | 12/2004 |
| JP | 2005-011414 | 1/2005 |

* cited by examiner

*Primary Examiner*—Angel A. Castro
(74) *Attorney, Agent, or Firm*—Martin Novack

(57) ABSTRACT

A thin-film magnetic head that has an improved protrusion efficiency under the condition of not only assuring the reliability of the-heating operation, but also stabilizing the read output is provided. The head comprises: a magnetic head element for writing and/or reading data signals; a heating element for generating heat at least during operations of the magnetic head element; and a first heatsink element provided adjacent to the heating element for receiving a part of the heat generated from the heating element, the first heatsink element being a distance from the magnetic head element.

33 Claims, 19 Drawing Sheets

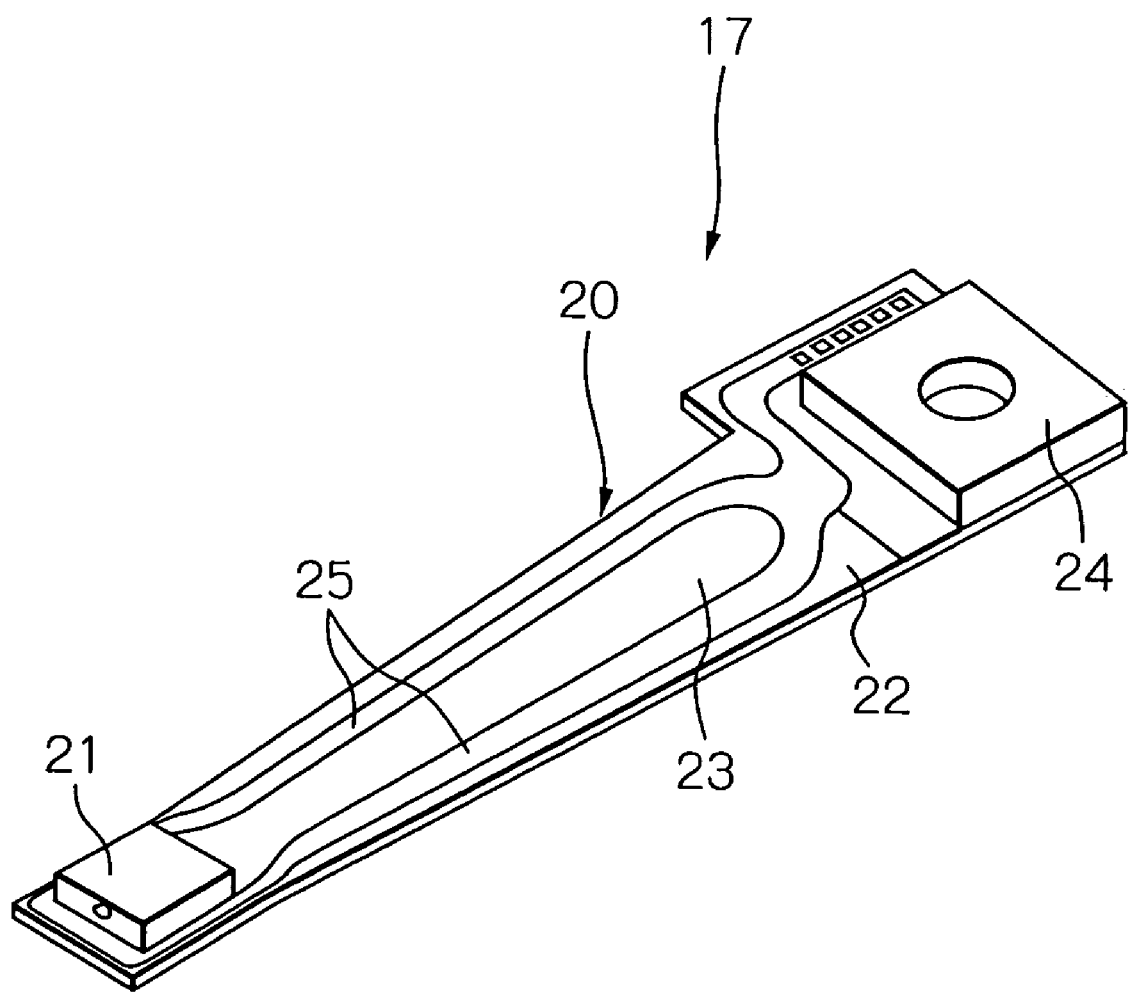

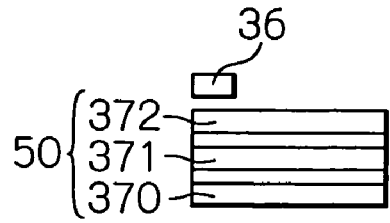
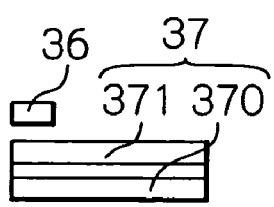
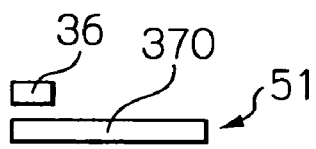
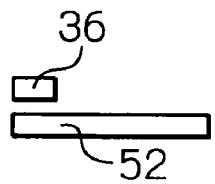
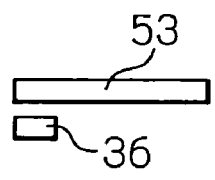
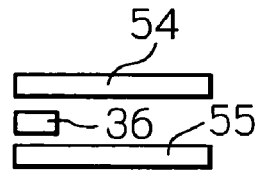
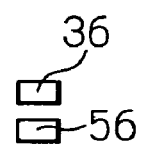
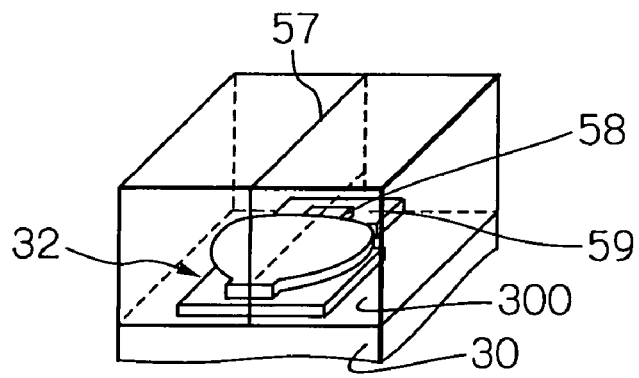
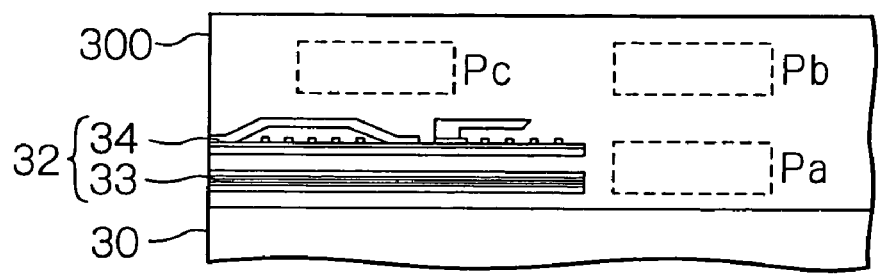

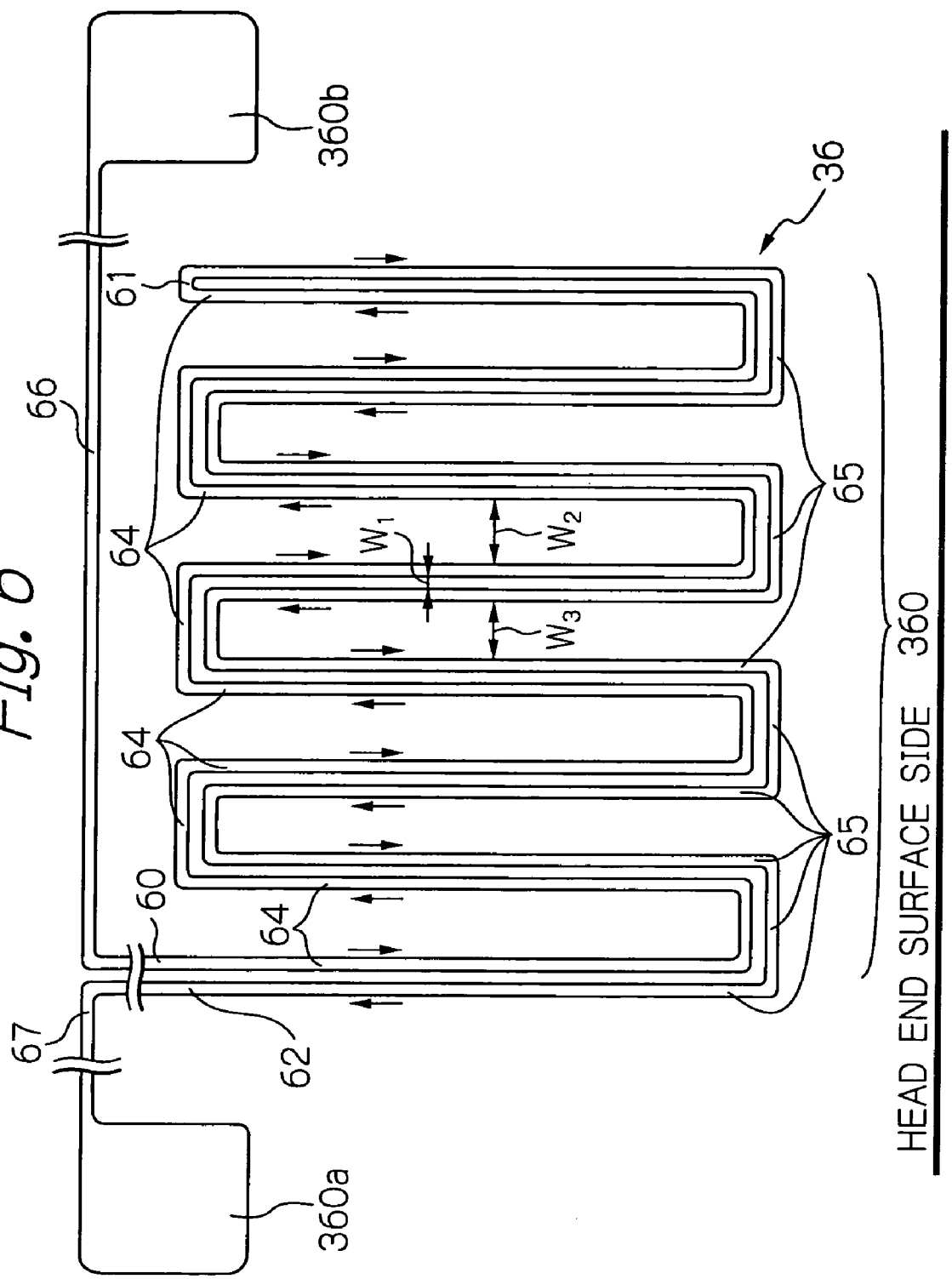

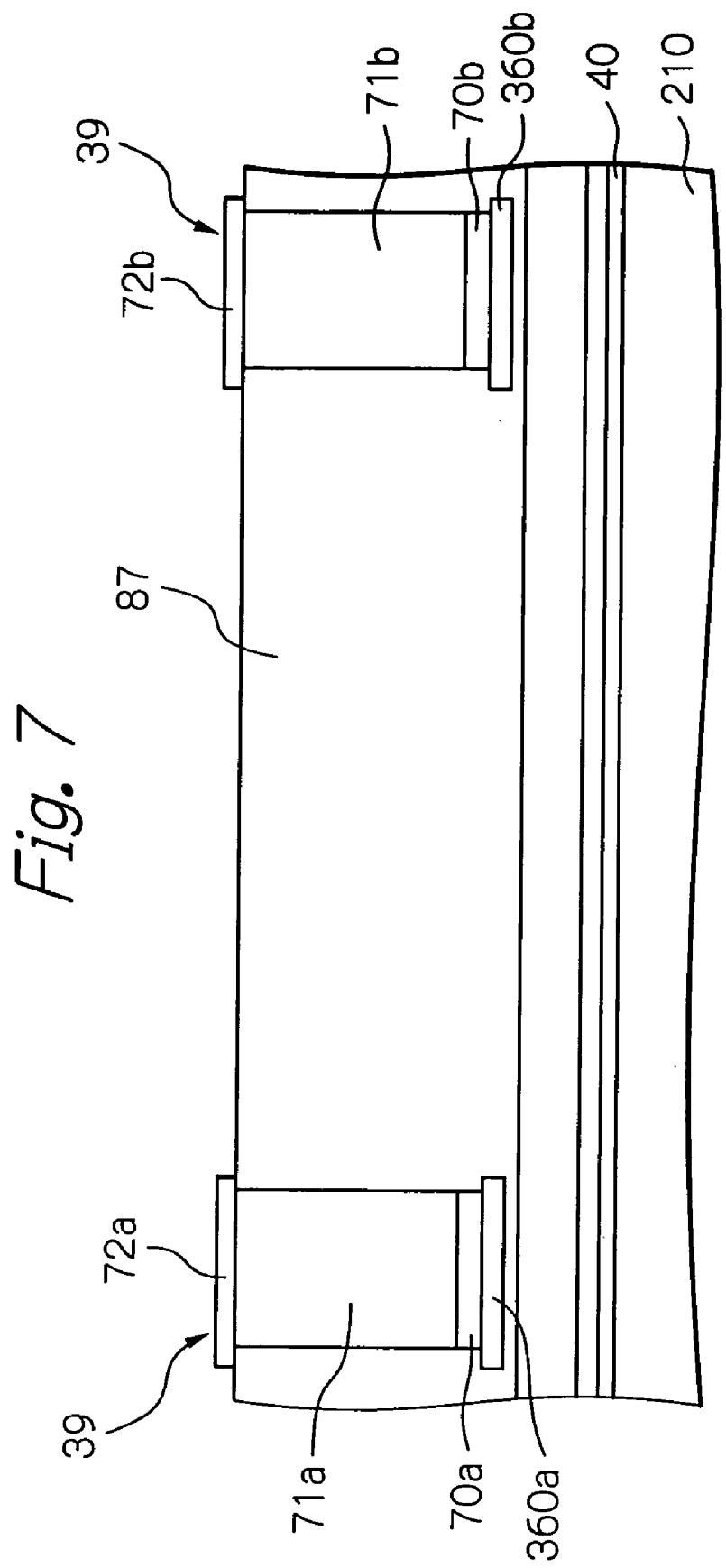

THIN-FILM MAGNETIC HEAD WITH HEATING ELEMENT AND HEATSINK

PRIORITY CLAIM

This application claims priority from Japanese patent application No. 2005-188017, filed on Jun. 28, 2005, which is incorporated herein by reference.

BACKGROUND OF THE INVENTION

1. Field of the Invention

The present invention relates to a thin-film magnetic head with a heating element and a heatsink, a head gimbal assembly (HGA) with the thin-film magnetic head and a magnetic disk drive apparatus with the HGA.

2. Description of the Related Art

In a magnetic disk drive apparatus, when writing or reading signals, a thin-film magnetic head (slider) hydrodynamically flies with a predetermined spacing (flying height) on a rotating magnetic disk. While flying on the magnetic disk, the thin-film magnetic head writes signals to the magnetic disk using magnetic fields generated from an inductive write head element, and reads signals by sensing magnetic fields corresponding to the signals from the magnetic disk with the use of an magnetoresistive (MR) effect read head element. On these cases, a magnetic spacing do is defined as an effective magnetic distance between ends of these head elements and the surface of the magnetic disk.

With higher recording density due to the increase in data storage capacity and miniaturization of the magnetic disk drive apparatus in recent years, a track width of the thin-film magnetic head is becoming smaller. In order to avoid the degradation of writing and reading performance due to the smaller track width, latest magnetic disk drive apparatus actually has the magnetic spacing $d_{MS}$ reduced down to the order of 10 nm or less.

Generally, when write currents are applied to the inductive write head element, a thermal pole tip protrusion (TPTP) phenomenon occurs due to a thermal expansion by Joule heat, eddy-current loss and so on, where the end of the magnetic head element is protruded toward the surface of the magnetic disk. In the case, the much small magnetic spacing $d_{MS}$ is likely to cause the protruded end of the magnetic head element to contact the surface of the magnetic disk. The contact by the protrusion has a possibility of making trouble (thermal asperity) such as an occurrence of abnormal signals, and further has a risk of causing physical damage or crash of the magnetic head element and the magnetic disk.

To avoid the troublemaking contact, some techniques are proposed, which control the magnetic spacing $d_{MS}$ by positively utilizing a TPTP phenomenon with the use of a heater provided inside the thin-film magnetic head, for example, in U.S. Pat. No. 5,991,113, US Patent Publications Nos. 2003/0174430 A1 and 2003/0099054 A1. In these techniques, the magnetic spacing $d_{MS}$ is designed in prospect of a protrusion due to the heat generated from the heater, and is adjusted by controlling the power applied to the heater during operation.

When the heater is provided in an overcoat layer covering the magnetic head element and in a position being in a certain distance from the slider substrate, the heat generated from the heater is accumulated in the overcoat layer, and causes the effective thermal expansion of the overcoat layer. As a result, the whole amount of protrusion of the head end surface per applied power becomes larger. However, in order to protrude the end of the magnetic head element effectively, the heater is needed to be closer to the magnetic head element. In the closer position, the heater also becomes closer to the slider substrate with comparatively high thermal conductivity. Therefore, the closer position of the heater causes the heat generated from the heater to be more dissipated via the slider substrate. As a method for avoiding this dissipation, the heat may be concentrated to the magnetic head element by miniaturizing the heater. The miniaturization of the heater enables the end of the magnetic head element to be protruded more effectively.

However, the miniaturization of the heater is likely to cause the temperature of the heater itself to be increased excessively. Generally, a stable heating operation even under intermittent uses is required to control the much small amount of the protrusion. Therefore, the heater is needed to have a high-precision in position and size, however, the excess increase in temperature has a possibility to cause the heater to be deformed, and what is more, to be destroyed due to breaking and so on. Therefore, in the case of the excess increase in temperature, not only the required degree of precision, but also the heating operation itself is not assured.

To deal with the problem, a thin-film magnetic head described in US Patent Publication No. 2004/0017638 A1 has a heatsink layer for diffusing the heat generated from the inductive write head element, though having no heater. In this head, the excess increase in temperature of the heater may be prevented, for example, by providing the heater near the heatsink to diffuse the heat accumulated in the heater itself. Furthermore, a thin-film magnetic head in which a heater is provided in a position above and opposed to a lower core layer (lower magnetic pole layer) though not for the purpose of diffusing heat, is disclosed in Japanese patent Publication No. 2005-011414A. The excess increase in temperature of the heater may also be prevented in this head.

However, a problem occurs that the heat generated from the heater is likely to degrade the reliability of the MR read head element.

When using either above-mentioned thin-film magnetic head described in US Patent Publication No. 2004/0017638 A1 or Japanese patent Publication No. 2005-011414A, the heat generated from the heater is likely to cause the temperature of an MR multilayer, which is a sensing part of the MR read head element, to be significantly increased because the large amount of the heat reaches the MR read head element through the heatsink layer or the lower magnetic pole layer. The significant increase in temperature is likely to cause deterioration in the reliability, and what is more, the output stability of the MR read head element. Especially, a giant magnetoresistive (GMR) read head element, which is recently well-used, has a comparatively high risk to make such a problem.

BRIEF SUMMARY OF THE INVENTION

Therefore, it is an object of the present invention to provide a thin-film magnetic head that has an improved protrusion efficiency of the magnetic head element due to the heat generated from the heater, under the condition of not only assuring the reliability of the heating operation due to the suppression of the excess increase in temperature of the heater, but also stabilizing the read output due to the suppression of the increase in temperature of the MR read head element, an HGA provided with this thin-film magnetic head and a magnetic disk drive apparatus provided with this HGA.

Here, some terms will be defined before explaining the present invention. In a layered structure of the magnetic head element formed on an element-formed surface of the slider substrate, a component that is closer to the element-formed surface than a standard layer is defined to be "below" or "lower" in relation to the standard layer, and a component that is in the stacking direction side of the standard layer is defined to be "above" or "upper" in relation to the standard layer.

According to the present invention, a thin-film magnetic head is provided, which comprises: at least one magnetic head element for writing and/or reading data signals; at least one heating element for generating heat at least during operations of the at least one magnetic head element; and at least one first heatsink element provided adjacent to the at least one heating element for receiving a part of the heat generated from the at least one heating element, the at least one first heatsink element being a distance from the at least one magnetic head element.

The first heater heatsink element as a heatsink for the heating element is adjacent to the heating element, that is to say, is no contact with, but quite close to the heating element to such a extent that the first heater heatsink element can surely receive a part of the heat generated from the heating element. Therefore, the excess increase in temperature of the heating element can be prevented even under obtaining the desired amount of protrusion. Further, the first heater heatsink element is a distance from the magnetic head element, that is to say, is physically separate from the magnetic head element with a predetermined distance. Therefore, the heat diffused from the first heatsink element can avoid contributing to the excess increase in temperature of the MR read head element. As a result, the protrusion efficiency of the magnetic head element due to the heat generated from the heating element is improved, under the condition of not only assuring the reliability of the heating operation due to the suppression of the excess increase in temperature of the heating element, but also stabilizing the read output due to the suppression of the increase in temperature of the MR read head element.

Here, the at least one magnetic head element preferably comprises an inductive write head element and at least one second heatsink element provided adjacent to the inductive write head element for receiving a part of the heat generated from the inductive write head element.

The second heatsink element play a role as a heatsink for the inductive write head element, therefore, the first heatsink element can be easily provided separately from the magnetic head element.

Further, it is also preferred that the at least one magnetic head element comprises an inductive write head element, and the at least one first heatsink element is provided in a position where the at least one first heatsink element can receive a part of the heat generated from the inductive write head element.

Further, the at least one first heatsink element preferably has a rectangular shape with a predetermined area, and a length in track-width direction of the rectangular shape is larger than a length in perpendicular direction to an air bearing surface (ABS) of the rectangular shape. The first heatsink element with the same area but the larger width causes the protrusion efficiency to be more improved even under further suppressing the increase in temperature of the MR read head element.

Further, the at least one first heatsink element is preferably provided opposite to the ABS in relation to the at least one magnetic head element.

It is also preferred that the at least one magnetic head element comprises an MR read head element comprising a lower shield layer and an upper shield layer, and the at least one first heatsink element is provided in a position with the same or almost the same height in the stacking direction as the lower shield layer or the upper shield layer. Here, the MR read head element may be a GMR read head element. Further, the at least one first heatsink element preferably comprises a single heatsink layer or a multilayer of a plurality of heatsink layers with/without intercalated insulating layer, and the single heatsink layer or each of the heatsink layers is formed of the same material as one of the lower shield layer, the upper shield layer and a plurality of magnetic pole layers of the inductive write head element.

Further, the at least one first heatsink element is preferably provided above/below the at least one heating element.

Furthermore, it is preferred that each of the at least one first heatsink element and the at least one heating element has a plane-symmetric shape, and each symmetry plane of the shape is lying in plane with a symmetry plane perpendicular to the ABS of the at least one magnetic head element.

Further, the at least one magnetic head element preferably comprises an inductive write head element for longitudinal magnetic recording or for perpendicular magnetic recording.

According to the present invention, a HGA is further provided, which comprises: the above-described thin-film magnetic head; first trace conductors of the at least one magnetic head element; second trace conductors for supplying currents to the at least one heating element; and a support structure for supporting the thin-film magnetic head.

According to the present invention, a magnetic disk drive apparatus is further provided, which comprises: at least one above-described HGA: at least one magnetic disk; and a recording/reproducing and heating control means for controlling read and write operations of the thin-film magnetic head to the at least one magnetic disk and for controlling currents supplied to the at least one heating element.

Further objects and advantages of the present invention will be apparent from the following description of preferred embodiments of the invention as illustrated in the accompanying drawings. Some elements have been designated with same reference numerals in the different drawings.

BRIEF DESCRIPTION OF THE SEVERAL VIEWS OF THE DRAWINGS

FIG. 2 shows a perspective view illustrating an embodiment of an HGA according to the present invention;

FIG. 3a shows a perspective view of an embodiment of a thin-film magnetic head (slider) provided on the end portion of the HGA;

FIG. 3b shows a plain view schematically illustrating a magnetic head element shown in FIG. 3a;

FIGS. 5a to 5i show cross-sectional views schematically illustrating various alternatives of the heater heatsink element according to the present invention;

FIG. 6 shows a plain view illustrating a structure of an embodiment of the heating element shown in FIG. 4a;

FIG. 7 shows a cross-sectional view taken along line B-B in FIG. 3a illustrating a structure of the drive electrodes for the heating element;

FIGS. 8a to 8h show cross-sectional views taken along line A-A in FIG. 3b explaining a manufacturing process of the thin-film magnetic head shown in FIG. 4a;

FIGS. 9a to 9f show cross-sectional views taken along line A-A in FIG. 3b explaining a manufacturing process of the thin-film magnetic head shown in FIG. 4a;

FIGS. 10a to 10c show cross-sectional views taken along line A-A in FIG. 3b explaining a manufacturing process of the thin-film magnetic head shown in FIG. 4a;

FIG. 13b shows a plain view explaining the size of the structure shown in FIG. 13a;

FIG. 14b shows a plain view explaining the size and position of the coil heatsink element in the thin-film magnetic head shown in FIG. 14a.

DETAILED DESCRIPTION OF THE INVENTION

Figure 1:
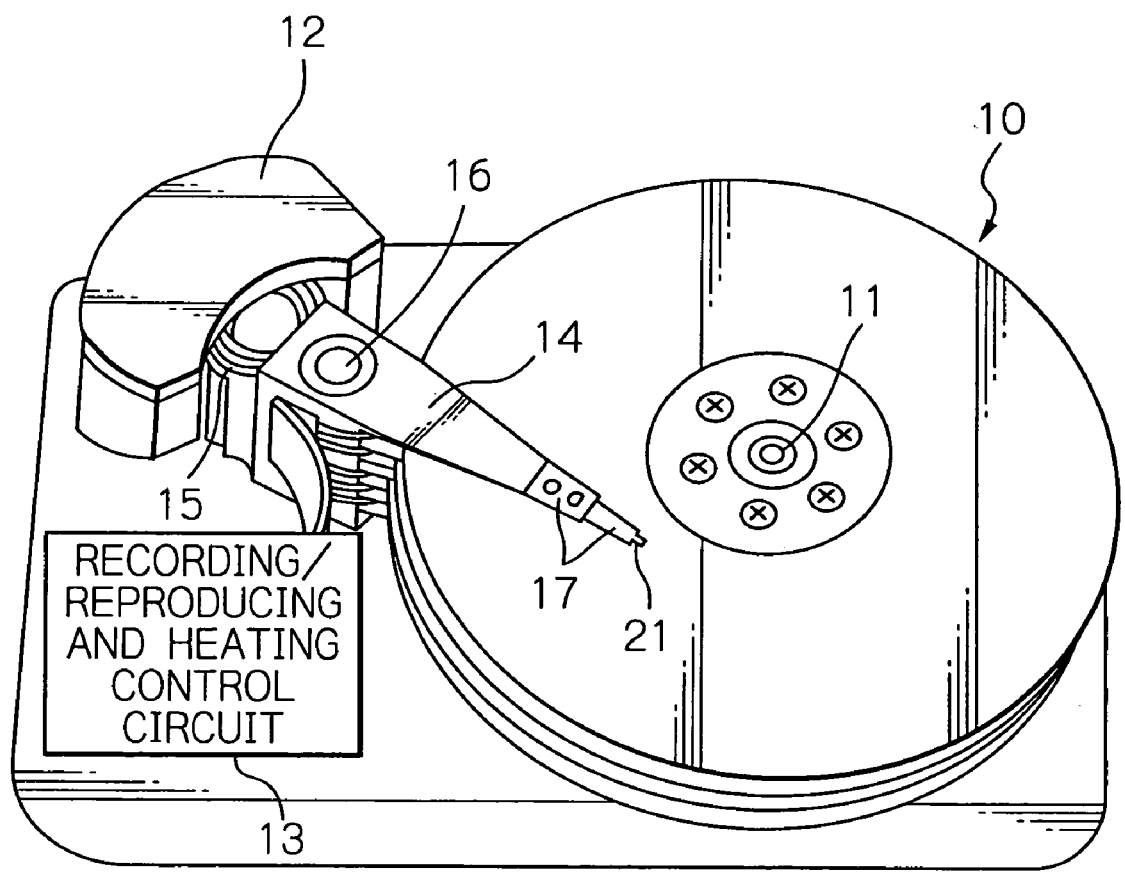
FIG. 1 shows a perspective view schematically illustrating a structure of a main part of an embodiment of a magnetic disk drive apparatus according to the present invention.
Figure 3B:
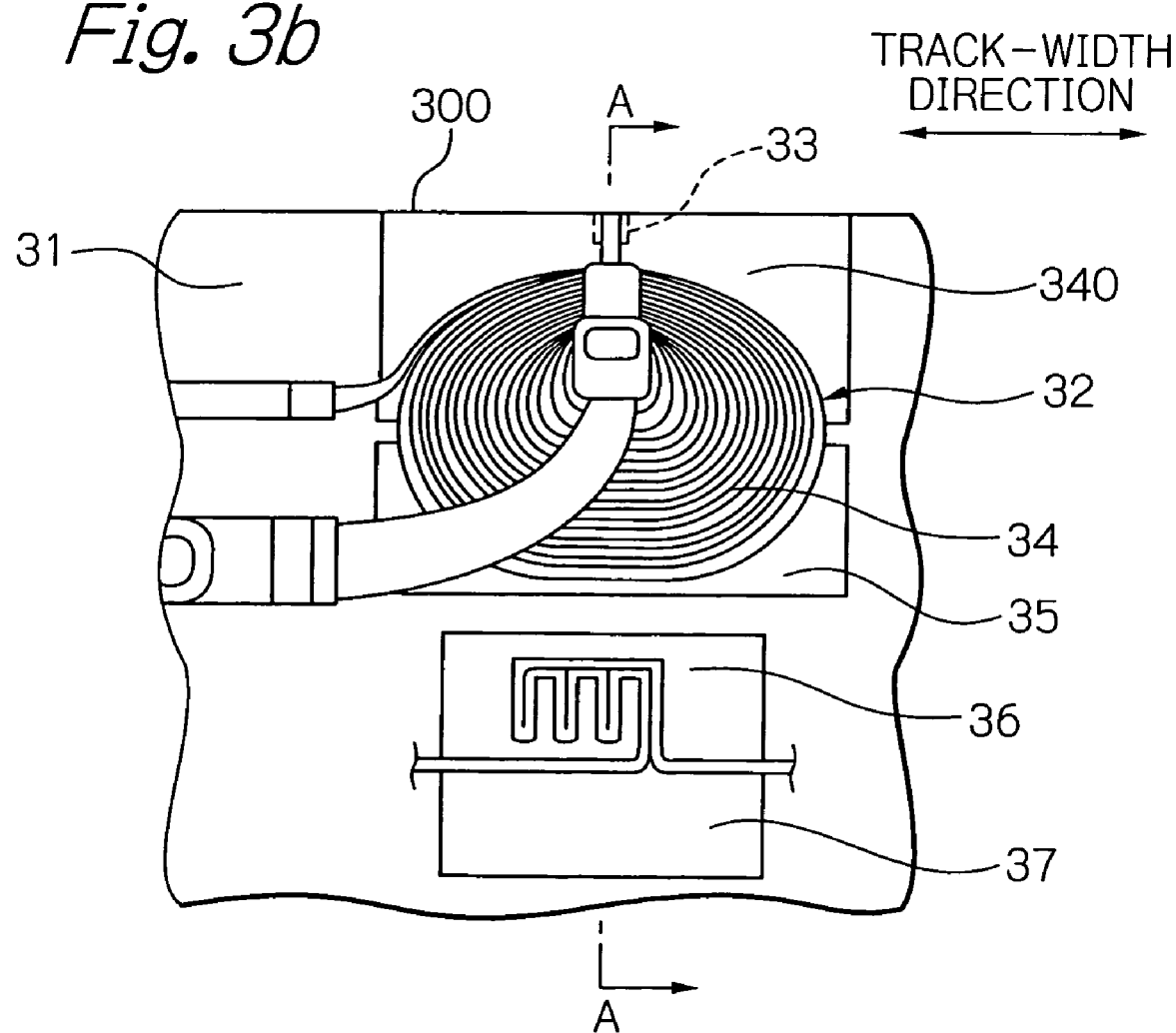

FIG. 1 shows a perspective view schematically illustrating a structure of a main part of an embodiment of a magnetic disk drive apparatus according to the present invention, FIG. 2 shows a perspective view illustrating an embodiment of an HGA according to the present invention, FIG. 3a shows a perspective view of an embodiment of a thin-film magnetic head (slider) provided on the end portion of the HGA, and FIG. 3b shows a plain view schematically illustrating a magnetic head element shown in FIG. 3a.

In FIG. 1, reference numeral 10 indicates a plurality of magnetic disks rotating around a rotational axis of a spindle motor 11, 12 indicates an assembly carriage device for positioning a thin-film magnetic head (slider) 21 on a track, and 13 indicates a recording/reproducing and heating control circuit for controlling read/write operations of the thin-film magnetic head and a heating operation of a heating element to be described later, respectively.

The assembly carriage device 12 is provided with a plurality of drive arms 14. These drive arms 14 are rotatable around a pivot bearing axis 16 by means of a voice coil motor (VCM) 15 and stacked in the direction along this axis 16. An HGA 17 is provided on the end portion of each drive arm 14. A slider is mounted on each HGA 17 in such a way as to face the surface of each magnetic disk 10. The each number of the magnetic disks 10, the drive arms 14, the HGAs 17 and the thin-film magnetic heads (sliders) 21 can also be only one.

As shown in FIG. 2, the HGA is constructed by fixing a slider 21 having a magnetic head element on an end portion of a suspension 20 and by electrically connecting one end of a wiring member 25 to signal electrodes of the slider 21.

The suspension 20 is mainly constructed of a load beam 22, a flexure 23 with elasticity fixed and supported on this load beam 22, a base plate 24 provided on the base portion of the load beam 22, and the wiring member 25 that is made up of trace conductors and connection pads electrically connected to both ends of the trace conductors and is provided on the flexure 23. It is obvious that the structure of the suspension in the HGA according to the present invention is not limited to the above-described one. Though not shown in the figure, it is also possible to attach a head drive IC chip at some midpoint of the suspension 20.

As shown in FIG. 3a, the thin-film magnetic head (slider) 21 is provided with an ABS 30 formed to obtain an appropriate flying height, a magnetic head element 32 formed on a element-formed surface 31, a heating element 36 for protruding the magnetic head element 32 toward the magnetic disk due to thermal expansion, a heater heatsink element (first heatsink element) 37 adjacent to the heating element 36 to receive a part of the heat generated from the heating element 36, four signal electrodes 38 and two drive electrodes 39 exposed on the surface of a overcoat layer 87 formed on the element-formed surface. The magnetic head element 32 includes an MR read head element 33 and an inductive write head element 34. The four signal electrodes 38 are connected with the MR read head element 33 and the inductive write head element 34, and the two drive electrodes 39 are connected with the heating element 36.

The two drive electrodes 39 are disposed in both sides of the group of the four signal electrodes 38 respectively. The disposition can prevent a crosstalk between the wirings of the MR read head element and the inductive write head element as is described in Japanese patent Publication No. 2004-234792A. Of course, when the crosstalk is allowed, the two drive electrodes 39 may be disposed in intermediate positions among the four signal electrodes 38. The number and positions of the electrodes are not limited to the mode in FIG. 3a. In the embodiment shown in FIG. 3a, there are six electrodes, however it is also possible to provide five electrodes and a ground connecting to the slider substrate.

As shown in FIG. 3b, one ends of the MR read head element 33 and the inductive write head element 34 reach a head end surface 300 on the side of the ABS 30. When writing and reading, the slider 21 hydrodynamically flies with a predetermined flying height on a rotating magnetic disk, and a reading by sensing signal field and a writing by applying signal fields are preformed with the one ends of the elements opposed to the surface of the magnetic disk.

A coil heatsink element (second heatsink element) 35 is provided adjacent to a lower magnetic pole layer 340 of the inductive write head element 34. The coil heatsink layer 35 suppresses the uncontrollable TPTP phenomenon due to the write operation by receiving and diffusing a part of the Joule heat and eddy-current loss generated by applying write currents through the inductive write head element 35.

Further, in the present embodiment, the heating element 36 and the heater heatsink element 37 are provided in a position opposite to the head end surface 300 (ABS 30) in relation to the magnetic head element 32. The magnetic head element 32 is protruded toward the surface of the magnetic disk in such a way that the head end surface 300 is swelled, due to the thermal expansion of the magnetic head element 32 itself by the heat generated by supplying power to the heating element 36, and due to the extrusion of the magnetic head element 32 by the thermal expansion of the surrounding materials. By controlling the protrusion, the magnetic spacing $d_{MS}$ can be adjusted in a desired narrow range.

In the present embodiment, The heater heatsink element 37 provided just below and adjacent to the heating element 36 has a rectangular shape and a larger area than that of the heating element 36, and receives a part of the heat generated from the heating element 36. The ratio of the received heat can be controlled by varying the size, the shape and the constituent material of the heater heatsink element 37, and the constituent material of the intermediate layer and the positional relation between the heater heatsink element 37 and the heating element 36, and so on. Therefore, the sufficient protrusion can be obtained with the heating element 36, even under preventing the excess increase in temperature of the heating element 36. Further, the heater heatsink element 37 is a predetermined distance from the magnetic head element 32, and is not connected with any portion of a material with high thermal conductivity such as a metal. Therefore, the heat diffused from the heater heatsink element 37 can avoid contributing to the excess increase in temperature of the MR read head element 33.

The size and shape of the heater heatsink element 37 and the positional relation between the heater heatsink element 37 and the heating element 36 and so on, are not limited to the above-mentioned embodiment. Alternatives of the heater heatsink element will be described in detail.

Figure 4A:
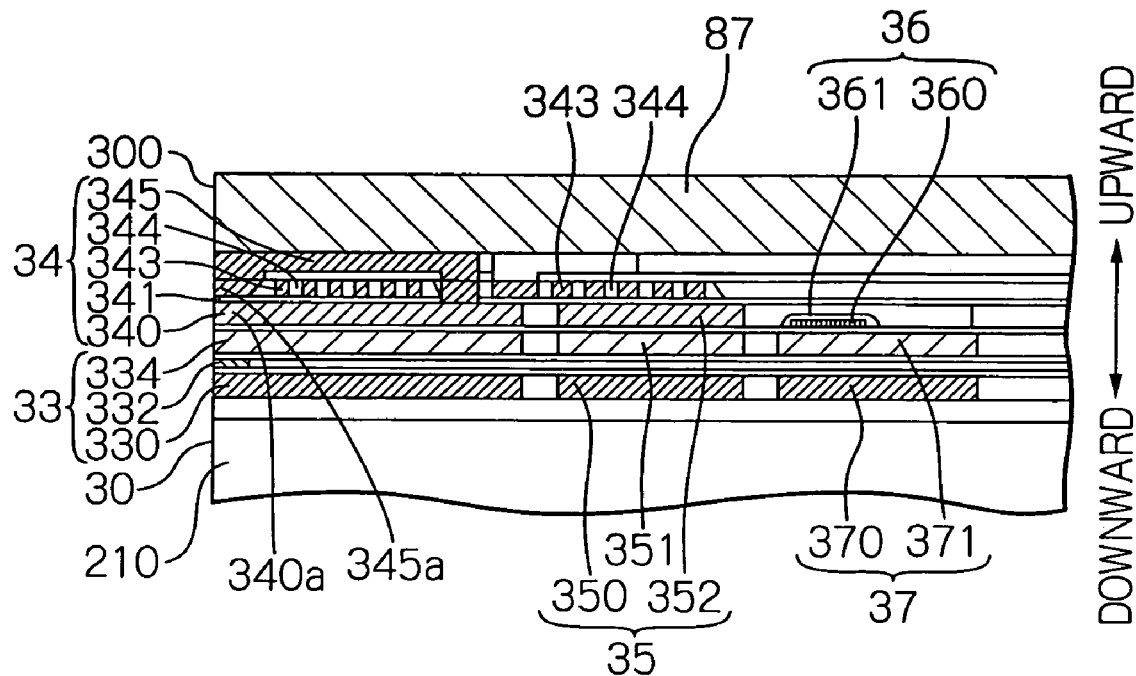
FIG. 4a shows a cross-sectional view taken along the line A-A in FIG. 3b illustrating a structure of a main part of a thin-film magnetic head provided with the magnetic head element for longitudinal magnetic recording shown in FIG. 3b.
Figure 4B:
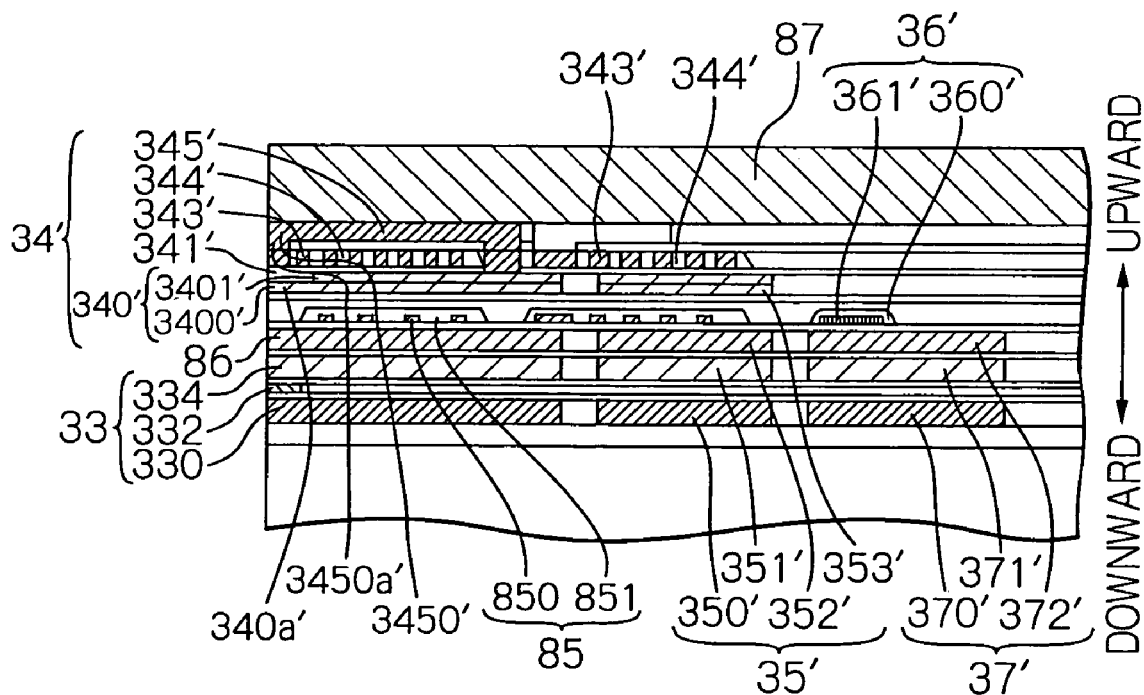
FIG. 4b shows a cross-sectional view illustrating a structure of a main part of a thin-film magnetic head provided with the magnetic head element for perpendicular magnetic recording as another embodiment according to the present invention.

FIG. 4a shows a cross-sectional view taken along the line A-A in FIG. 3b illustrating a structure of a main part of a thin-film magnetic head provided with the magnetic head element 32 for longitudinal magnetic recording shown in FIG. 3b, and FIG. 4b shows a cross-sectional view illustrating a structure of a main part of a thin-film magnetic head provided with the magnetic head element 32' for perpendicular magnetic recording as another embodiment according to the present invention. In FIG. 4b, components corresponding to the components shown in FIG. 4a are designated with same reference numerals as in FIG. 4a, and the explanations of their structures are omitted. Further, the number of turns of the coil in FIGS. 4a and 4b is shown as if to be smaller than the number of turns in FIG. 3b for simplicity of drawings.

In FIG. 4a, reference numeral 210 indicates a slider substrate having the ABS 30 opposed to the surface of the magnetic disk. On the element-formed surface as a side surface when the ABS 30 is set to a bottom, the MR read head element 33, the inductive write head element 34, the coil heatsink element (second heatsink element) 35, the heating element 36, the heater heatsink element (first heatsink element) 37, and the overcoat layer 87 covering these elements are mainly formed.

The MR read head element 33 includes an MR multilayer 332, a lower shield layer 330 and an upper shield layer 334 disposed in positions sandwiching the MR multilayer 332. The MR multilayer 332 includes a current-in-plane giant magnetoresistive (CIP-GMR) multilayered film, a current-perpendicular-to-plane giant magnetoresistive (CPP-GMR) multilayered film, or a tunnel magnetoresistive (TMR) multilayered film, and senses signal fields from the magnetic disk with very high sensitivity. The upper and lower shield layers 334 and 330 play the role of shielding external magnetic fields that causes noise for the MR multilayer 332.

When the MR multilayer 332 includes the CIP-GMR multilayered film, upper and lower shield gap layers are provided in respective positions between the MR multilayer 332 and each of the upper and lower shield layers 334 and 330, and further, an MR lead conductive layer is formed for applying sense currents and bringing out reproduction outputs. Whereas, when the MR multilayer 332 includes the CPP-GMR or TMR multilayered film, the upper and lower shield layers 334 and 340 act also as lower and upper electrodes, respectively. In the case, the upper and lower shield gap layers and the MR lead conductive layer are unnecessary and omitted, and an insulating layer is formed on a back side of the MR multilayer 332 when viewing from the head end surface 300 and on both sides in the track-width direction of the MR multilayer 332.

The heater heatsink element 37 plays a significant role especially in the case that the MR multilayer 332 includes the CIP-GMR or CPP-GMR multilayered film. Actually, the GMR effect has larger temperature dependence than the TMR effect, and the increase in temperature seriously lowers the GMR effect. Therefore, in order to maintain the large output stably in the case, the increase in temperature of the CIP-GMR or CPP-GMR multilayered film is needed to become smaller. Furthermore, in the case, the deterioration of the MR read head element due to an accelerated electromigration is needed to be avoided because the temperature of the CIP-GMR or CPP-GMR multilayered film essentially becomes rather large due to the large sense current application. According to the present invention, the heater heatsink element 37 solves this problem in the case.

The inductive write head element 34 is for longitudinal magnetic recording in the present embodiment, and is provided with a lower magnetic pole layer 340, a write gap layer 341, a coil layer 343, a coil-insulating layer 344 and an upper magnetic pole layer 345. The upper and lower magnetic pole layers 345 and 340 are magnetic paths to guide the magnetic flux induced by currents flowing through the coil layer 343, and the end portions 345a and 340a pinch the end portion on the head end surface 300 side of the write gap layer 341. Write fields as leakage magnetic fields from the end portion of the write gap layer 341 perform writing to the magnetic disk for longitudinal magnetic recording. The ends on the magnetic disk side of the upper and lower magnetic pole layers 345 and 340 reach the head end surface 300. The head end surface 300 is coated with diamond like carbon (DLC), etc. as an extremely thin protective film. The coil layer 343 shown in FIG. 4a is a monolayer, however the coil layer may also has a two or more layered structure or a helical coil shape.

A non-magnetic layer formed of an insulating material or a metal is provided between the upper shield layer 334 and the lower magnetic pole layer 340 for magnetically separating the MR read head element 33 from the inductive write head element 34. However, the non-magnetic layer is not necessarily needed, and instead of the non-magnetic layer sandwiched by the upper shield layer 344 and the lower magnetic pole layer 340, only one magnetic layer may be formed which serves as the latter two layers 344 and 340.

The coil heatsink element (second heatsink element) 35 is provided below and adjacent to a portion of the coil layer 343 further from the head end surface than a back-gap portion described later (as reference numeral 47 in FIG. 9a). The coil heatsink element 35 has a structure that a first coil heatsink layer 350, a second coil heatsink layer 351 and a third coil heatsink layer 352 are stacked in this order among which insulating layers are intercalated. The first coil heatsink layer 350, the second coil heatsink layer 351 and the third coil heatsink layer 352 are formed of the same metal materials as the lower shield layer 330, the upper shield layer 334 and the lower magnetic pole layer 340 respectively, therefore, the coil heatsink element 35 has a high thermal conductivity as a whole. As a result, the coil heatsink layer 35 receives and diffuses a part of the heat generated from the inductive write head element 34 effectively, and then, suppresses the TPTP phenomenon due to the write operation. Here, the intercalated insulating layers may be omitted. The coil heatsink element may also be constituted of one or two of the first, second and third coil heatsink layers with/without intercalated insulating layers. Further, the coil heatsink element is not necessarily needed, and may be omitted when the degree of the heat generated from the inductive write head element 34 is within the allowable range.

The heating element 36 is provided in a position opposite to the head end surface 300 in relation to the magnetic head element 32 and in a position with the same height in the stacking direction as the lower magnetic pole layer 340, and is provided with a heating layer 360 and a heater insulating layer 361. The power supply to the heating layer 360 causes a predetermined heat to be generated. The heater insulating layer 361 may be omitted by using the overcoat layer as substitution of the layer 361.

The heater heatsink element (first heatsink element) 37 is provided below the heating element 36 through an insulating layer, and has a multilayered structure that a first heater heatsink layer 370 and a second heater heatsink layer 371 are stacked with an insulating layer intercalated between these layers. The first heater heatsink layer 370 and the second heater heatsink layer 371 are formed of the same materials as the lower shield layer 330 and the upper shield layer 334 respectively. Therefore, the heater heatsink element 37 has a high thermal conductivity as a whole. As a result, the heater heatsink layer 37 receives and diffuses a part of the heat generated from the heating element 36 effectively, and then, prevents the excess increase in temperature of the heating element 36 itself. Here, The first heater heatsink layer 370 and the second heater heatsink layer 371 are not limited to magnetic layers, and may be nonmagnetic layers with a certain degree of thermal conductivity. However, when the second heater heatsink layer has an electrical conductivity, some insulating means such as an insulating layer must be provided between the heater heatsink element 37 and the heating element 36 in order to ensure electrical insulation.

Next, another embodiment of the thin-film magnetic head according to the present invention will be explained.

In FIG. 4b, the inductive write head element 34' is for perpendicular magnetic recording, and is provided with a main magnetic pole layer 340', a write gap layer 341', a coil layer 343', a coil insulating layer 344' and an auxiliary magnetic pole layer 345'. The main magnetic pole layer 340' is a magnetic path to converge and guide the magnetic flux induced by currents flowing through the coil layer 343', and consists of a main pole principal layer 3400' and a main pole support layer 3401'. The length (thickness) in the stacking direction of the end portion 340a' on the head end surface 300 side of the main magnetic pole layer 340' becomes smaller which corresponds to the layer thickness of the main pole principal layer 3400'. As a result, the main magnetic pole layer 340' can generate a fine write field corresponding to higher density recording.

The end portion on the head end surface 300 side of the auxiliary magnetic pole layer 345' has a larger thickness in the stacking direction than that of the other portions of the auxiliary magnetic pole layer 345' as a trailing shield portion 3450'. The trailing shield portion 3450' causes a magnetic field gradient between the end portion 3450a' of the trailing shield portion 3450' and the end portion 340a' of the main magnetic pole layer 340' to be steeper. As a result, a jitter of signal outputs becomes smaller, and therefore, an error rate during reading can be decreased.

In FIG. 4b, a shielding-between-elements layer 86 and a backing coil element 85 are formed between the MR read head element 33' and the inductive write head element 34'. The backing coil element 85 includes a baking coil layer 850 and a backing coil insulating layer 851, and suppresses the wide area adjacent-track erase (WATE) behavior, which is an unwanted write or read operation to the magnetic disk, by generating a magnetic flux for negating the magnetic loop that arises from the inductive write head element 34' through the upper and lower shield layers of the MR read head element 33'. The coil layer 343' is a monolayer in FIG. 4b, however may also have a two or more layered structure or a helical coil shape.

Further, in FIG. 4b, a coil heatsink element (second heatsink element) 35', a heating element 36' and a heater heatsink element (first heatsink element) 37' are provided.

The coil heatsink element 35' has a structure that a first coil heatsink layer 350', a second coil heatsink layer 351', a third coil heatsink layer 352' and a fourth coil heatsink layer 353' are stacked in this order among which a portion of the backing coil element 85 and insulating layers are intercalated. The first coil heatsink layer 350', the second coil heatsink layer 351', the third coil heatsink layer 352' and the fourth coil heatsink layer 353' are formed of the same metal materials as the lower shield layer 330, the upper shield layer 334, the insulating-between-elements layer 86 and the main magnetic pole layer 340' respectively, therefore, the coil heatsink element 35' has a high thermal conductivity as a whole. As a result, the coil heatsink layer 35' receives and diffuses a part of the heat generated from the inductive write head element 34' and the backing coil element 85 effectively, and then, suppresses the TPTP phenomenon due to the write operation. Here, the intercalated insulating layers may be omitted, and the coil heatsink element may be constituted of one, two or three of the first, second, third and fourth coil heatsink layers with/without intercalated insulating layers.

The heating element 36', in the present embodiment, is provided in a position opposite to the head end surface 300 in relation to the magnetic head element 32' and in a position with the same height in the stacking direction as the backing coil element 85, and is provided with a heating layer 360' and a heater insulating layer 361'. The power supply to the heating layer 360' causes a predetermined heat to be generated.

The heater heatsink element 37' is provided below the heating element 36' through an insulating layer, and has a multilayered structure that a first heater heatsink layer 370', a second heater heatsink layer 371' and a third heater heatsink layer 372' are stacked with insulating layers intercalated among these layers. The first heater heatsink layer 370', the second heater heatsink layer 371' and the third heater heatsink layer 372' are formed of the same metal materials as the lower shield layer 330, the upper shield layer 334 and the insulating-between-elements layer 86 respectively, therefore, the heater heatsink element 37' has a high thermal conductivity as a whole. As a result, the heater heatsink layer 37' receives and diffuses a part of the heat generated from the heating element 36' effectively, and then, prevents the excess increase in temperature of the heating element 36' itself.

FIGS. 5a to 5i show cross-sectional views schematically illustrating various alternatives of the heater heatsink element according to the present invention.

As shown in FIG. 5a, a heater heatsink element 50 may include the first layer 370, the second layer 371 and a third layer 372 that is formed of the same metal material as the lower magnetic pole layer 340. As shown in FIG. 5b, the heater heatsink element 37 may include the first layer 370 and the second layer 371, which corresponds to the structure shown in FIG. 4a. Further, as shown in FIG. 5c, the heater heatsink element 51 may have a monolayer structure of only the first layer 370. In these cases, an insulating layer intercalated between heater heatsink layers may be omitted. Furthermore, the heater heatsink element may consist of only the second or third layer. Moreover, the heater heatsink element may also be constituted of two of the first, second and third layers with/without intercalated insulating layers.

As shown in FIG. 5d, a heater heatsink element 52 may be provided below and adjacent to the heating element 36, which corresponds to the structure shown in FIG. 4a. Further, as shown in FIG. 5e, a heater heatsink element 53 may be provided above and adjacent to the heating element 36. Furthermore, as shown in FIG. 5f, two heater heatsink elements 54 and 55 may be provided above and below the heating element 36 respectively, sandwiching the heating element 36. The size of the heater heatsink element can be set freely in the physically allowable range according to a predetermined rate of receiving the heat from the heating element. For example, as shown in FIG. 5g, a heatsink element with an area approximately as small as that of the heating element 36 may be provided. The shape of the heater heatsink element is not limited to the rectangular shape, and the heater heatsink element may have a convex shape, a quadrangular shape in which at least one corner is lacked, a triangular shape or a half-circle shape, or a combination of one, two or more than two of these shapes, or one of these shapes or the combination shape in which the corner is rounded.

Generally, in order to protrude the position of the end of the magnetic head element most in the track-width direction, the protrusion of the magnetic head element due to the heat generated from the heat element is needed to show a plane symmetry on a plane 57 shown in FIG. 5h that is a symmetry plane of the shape of the magnetic head element and is perpendicular to the head end surface 300 (ABS 30). For this purpose, the shapes of the heating element and the heater heatsink element preferably have a plane symmetry on the symmetry plane 57 as a heating element 58 and a heater heatsink element 59 have. Further, when two or more pairs of the heating element and the heater heatsink element are provided, the configuration of these pairs preferably has a plane symmetry on the symmetry plane 57.

Furthermore, as shown in FIG. 5i, a pair of the heating element and the heater heatsink element is preferably provided in a position $P_a$ opposite to the head end surface 300 (ABS 30) in relation to the magnetic head element, in a position $P_b$ above the position $P_a$, or in a position $P_c$ above the magnetic head element 32.

According to any of the just-described embodiments and alternatives shown in FIGS. 5a to 5i, because the heater heatsink element is adjacent to the heating element and is a predetermined distance from the magnetic head element, the sufficient protrusion of the magnetic head element can be obtained with the heating element, even under preventing the excess increase in temperature of the heating element and suppressing more increase in temperature of the MR read head element.

FIG. 6 shows a plain view illustrating a structure of an embodiment of the heating element 36 shown in FIG. 4a.

According to FIG. 6, the heating element 36 includes the heating layer 360 that consists of one line meandering in layer, and the lead electrodes 360a and 360b that are connected respectively to both ends of the heating layer 360, constituting a current path with a predetermined length.

More specifically, the heating layer 360 consists of an up-line section 64 formed so as to meander in a square wave form from a predetermined starting point 60 to a turn-round 61, a down-line section 65 formed so as to return from the turn-round 61 to an end point 62 close to the starting point 60 meandering along the up-line section 64, a connection section 66 that connects the starting point 60 and the lead electrode 360b, and a connection section 67 that connects the end point 62 and the lead electrode 360a. The distance $W_1$ between the up-line section 64 and the down-line section 65 formed so as to run along each other is set to be narrower than the distance $W_2$ between the mutually facing parts of the up-line section 64 and the distance $W_3$ between the mutually facing parts of the down-line section 65. As is obvious, the shape of the heating layer is not limited to the just-described embodiment, and may be a simple line, a U-shaped line or any shape the heating element of which with a predetermined area can generate the required amount of heat.

The heating layer 360 has a thickness of, for example, approximately 0.03 μm to 5 μm and is made of, for example, a material containing NiCu. The content of Ni in this NiCu is, for example, approximately 15 to 60 atomic % and preferably 25 to 45 atomic %. Furthermore, at least one of elements Ta, Al, Mn, Cr, Fe, Mo, Co, Rh, Si, Ir, Pt, Ti, Nb, Zr and Hf may be contained as an additive to this NiCu. The content of this additive is preferably 5 atomic % or less.

Furthermore, the heating layer 360 may also be made of a material containing NiCr. In this case, the content of Ni in this NiCr is approximately 55 to 90 atomic % and preferably 70 to 85 atomic %. Furthermore, at least one of elements Ta, Al, Mn, Cu, Fe, Mo, Co, Rh, Si, Ir, Pt, Ti, Nb, Zr and Hf may also be included as an additive to this NiCr. The content of the additive is preferably 5 atomic % or less.

Furthermore, the heating layer 360 may also be made of single Ta or a material containing Ta. Here, at least one of elements Al, Mn, Cu, Cr, Fe, Mo, Co, Rh, Si, Ir, Pt, Ti, Nb, Zr and Hf may also be included as an additive to this Ta or the material containing Ta. The content of the additive is preferably 5 atomic % or less.

Furthermore, the heating layer 360 may also be made of single W or a material containing W. Here, at least one of elements Al, Mn, Cu, Cr, Fe, Mo, Co, Rh, Si, Ir, Pt, Ti, Nb, Zr and Hf may also be included as an additive to this W or the material containing W. The content of the additive is preferably 5 atomic % or less.

In addition, the heating layer 360 may also be made of Ti, Cu, Au or NiFe. Actually, a material with rather low temperature-dependence of resistance is preferably used. Further, the lead electrodes 360a and 360b may also be made of the same material as that of the heating layer 360.

FIG. 7 shows a cross-sectional view taken along line B-B in FIG. 3a illustrating a structure of the drive electrodes 39 for the heating element 36.

According to FIG. 7, the lead electrodes 360a and 360b extracted from the heating layer 360 shown in FIG. 6 are emerged on the cross-section. Base electrode films 70a and 70b with conductivity are formed on the lead electrodes 360a and 360b respectively. Bumps 71a and 71b extending upward which are formed by electrolytic plating using the base electrode films 70a and 70b as electrodes are provided on the base electrode films 70a and 70b respectively. The base electrode films 70a and 70b, and bumps 71a and 71b are made of a conductive material such as Cu. The thickness of the base electrode films 70a and 70b is approximately 10 nm to 200 nm and the thickness of the bumps 71a and 71b is approximately 5 μm to 30 μm.

The top ends of the bumps 71a and 71b are exposed from the overcoat layer 87, and pads 72a and 72b are provided on these top ends. These above-described elements constitute the drive electrodes 39. Electric currents are supplied to the heating element through the drive electrodes 39. Likewise, the MR read head element 33 and the inductive write head element 34 are connected to the signal electrodes 38 shown in FIG. 3a. However, the connection structure of these elements is not shown for simplicity of drawings.

FIGS. 8a to 8h, FIGS. 9a to 9f and FIGS. 10a to 10c show cross-sectional views taken along line A-A in FIG. 3b explaining a manufacturing process of the thin-film magnetic head shown in FIG. 4a.

Figure 8A:
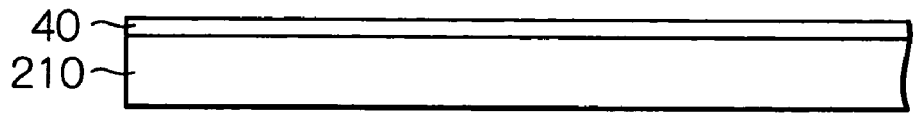
Figure 8B:
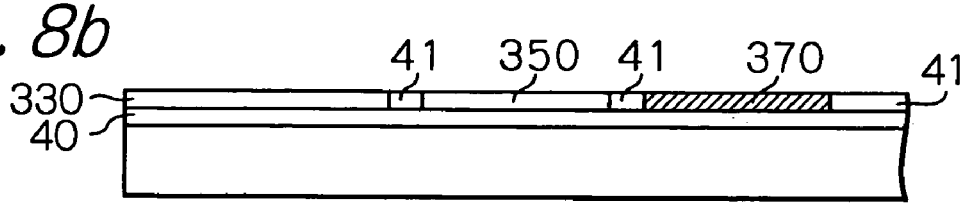

Hereinafter, the manufacturing process of the thin-film magnetic head shown in FIG. 4a will be explained with reference to the figures. First, as shown in FIG. 8a, an insulating base layer 40 is formed of, for example, Al$_2$O$_3$ or SiO$_2$, etc. with thickness of approximately 0.1 μm to 5 μm, deposited on the slider substrate (wafer substrate) 210 made of AlTiC (Al$_2$O$_3$—TiC), etc. using, for example, sputtering technique. Next, as shown in FIG. 8b, the lower shield layer 330, the first coil heatsink layer 350 and the first heater heatsink layer 370 are formed of, for example, NiFe, CoFeNi, CoFe, FeN or FeZrN, etc. or a multilayer of these alloys with thickness of approximately 0.5 μm to 3 μm on the insulating base layer 41 using, for example, frame plating technique. Then, an insulating layer formed of, for example, Al$_2$O$_3$ or SiO$_2$, etc. is deposited using, for example, sputtering technique, and a planarizing layer 41 is formed by planarizing the insulating layer using chemical mechanical polishing (CMP) technique.

Figure 8C:
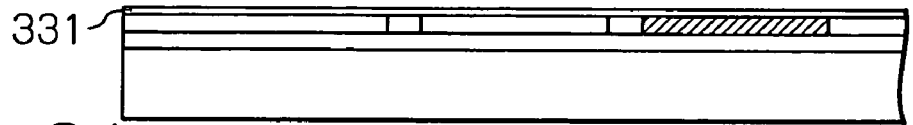
Figure 8D:
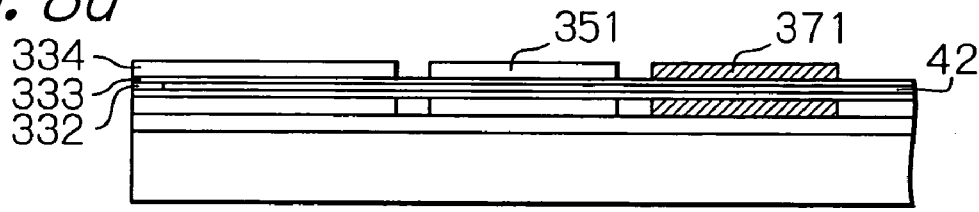

Next, as shown in FIG. 8c, the lower shield gap layer 331 is formed of, for example, Al$_2$O$_3$, SiO$_2$, AlN or DLC, etc. with thickness of approximately 0.01 μm to 0.5 μm deposited on the lower shield layer 330 using, for example, a sputtering technique or a chemical vapor deposition (CVD) technique. Next, as shown in FIG. 8d, the MR multilayered film such as a anisotropic magnetoresistive (AMR) multilayered film, a GMR multilayered film including a spin-valve magnetoresistive (SVMR) multilayered film or TMR multilayered film is formed. Then, resist mask patterns having a photographic negative shape (reverse shape in relation to existence or nonexistence of pattern) of a MR lead layer (not shown in the figure) is formed. The cross-section of the resist mask pattern preferably has an inverse tapered shape appropriate to a lift-off process performed later. Next, The MR multilayered film is etched with the resist mask patterns as masks using, for example, a milling technique. Then, films for forming a magnetic domain control layer (not shown in the figure) and the MR lead layer are formed without removing the resist mask patterns using, for example, sputtering technique. After that, the resist mask patterns and the films thereon for forming the magnetic domain control layer and the MR lead layer are removed (lifted-off) with a organic solvent such as a acetone or an NMP. Here, the film for forming the magnetic domain control layer is made of an antiferromagnetic material such as CoPt or CoPtCr, etc. with thickness of the order in ten nanometers. The film for forming the MR lead layer is made of a conductive material such as W, TiW, Au, AuCu, Ta or Cu with thickness also of the order in ten nanometers.

Next, resist mask patterns having a shape into which the shape of the MR multilayered film and the MR lead layer are coupled are formed. The cross-section of the resist mask pattern preferably has an inverse tapered shape appropriate to a lift-off process performed later. Next, The MR multilayered film and the MR lead layer are etched with the resist mask patterns as masks using, for example, a milling technique. Then, an insulating film for forming a refill planarizing layer 42 is formed without removing the resist mask patterns using, for example, sputtering technique. After that, the resist mask patterns and the insulating films thereon are removed (lifted-off) with a organic solvent such as a acetone or an NMP. The formations of the MR multilayered film 332, the magnetic domain control layer, the MR lead layer and the refill planarizing layer 42 are completed through the above-described lift-off process. Here, the film for forming the refill planarizing layer 42 is made of an insulating material such as Al$_2$O$_3$, SiO$_2$, AlN or DLC.

Figure 8E:
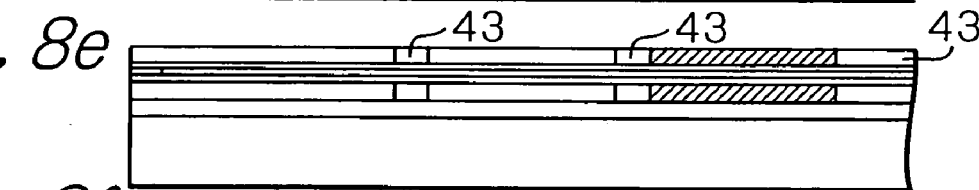

Next, an upper shield gap layer 333 are formed of, for example, Al$_2$O$_3$, SiO$_2$, AlN or DLC with thickness of approximately 0.01 μm to 0.05 μm using, for example, a sputtering technique or a CVD technique. Then, the upper shield layer 334, the second coil heatsink layer 351 and the second heater heatsink layer 371 are formed of, for example, NiFe, CoFeNi, CoFe, FeN or FeZrN, or a multilayer of these alloys etc. with thickness of approximately 0.5 μm to 3 μm deposited on the upper shield gap layer 333 using, for example, a frame plating technique. The formation of the MR read head element 33 is completed through the above-described process. After that, as shown in FIG. 8e, a planarizing layer 43 is formed by depositing an insulating layer made of, for example, Al$_2$O$_3$ or SiO$_2$ with, for example, a sputtering technique and then planarizing the insulating film with a CMP technique.

Figure 8F:
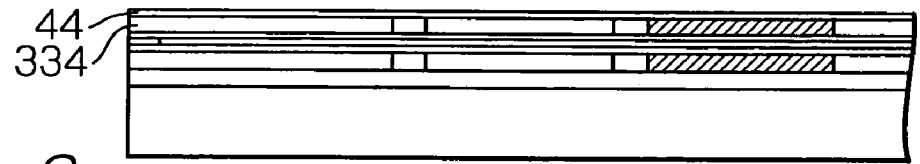
Figure 8G:
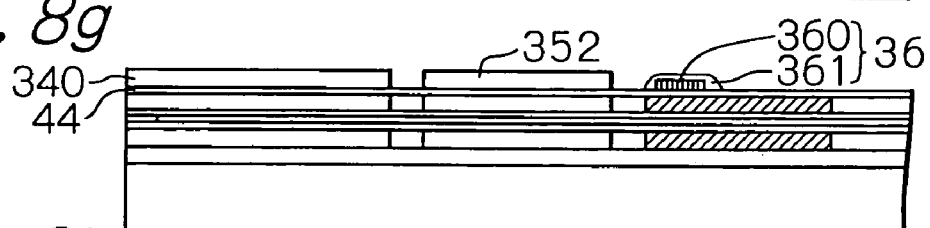

Next, as shown in FIG. 8f, a non-magnetic layer 44 is formed of an insulating material such as Al$_2$O$_3$, SiO$_2$, AlN or DLC or of a metal material such as Ti, Ta or Pt with thickness of approximately 0.1 μm to 0.5 μm using, for example, a sputtering technique or a CVD technique, for the purpose of magnetically isolating the MR read head element 33 from the inductive write head element formed later. Then, as shown in FIG. 8g, the lower magnetic pole layer 340 is formed of, for example, NiFe, CoFeNi, CoFe, FeN or FeZrN, or a multilayer of these alloys, etc. with thickness of approximately 0.5 μm to 3 μm deposited on the non-magnetic layer 44 using, for example, a frame plate technique.

Figure 8H:
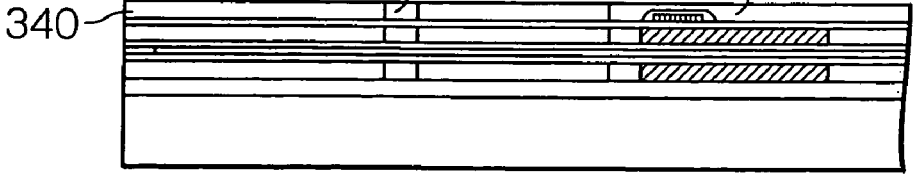

Further, the heating layer 360 is formed of, for example, approximately 0.01 μm to 5 μm and is made of, for example, NiCu, etc. as described above with thickness of approximately 0.03 μm to 5 μm deposited on the non-magnetic layer 44 using, for example, a sputtering technique or a frame plating technique, and a dry-etching technique. Then, a heater insulating layer 361 is formed of, for example, a heat-cured novolak resist so as to cover the heating layer 360 using, for example, a photolithographic method. After that, as shown in FIG. 8h, a planarizing layer 46 is formed by depositing an insulating layer made of, for example, Al$_2$O$_3$ or SiO$_2$ with, for example, a sputtering technique and then planarizing the insulating film with a CMP technique.

Figure 9A:
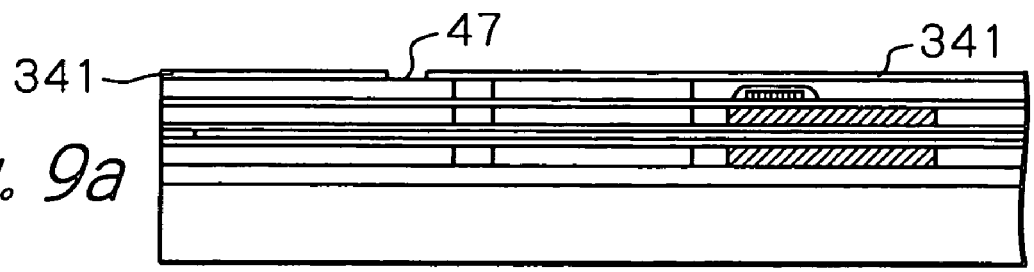
Figure 9B:
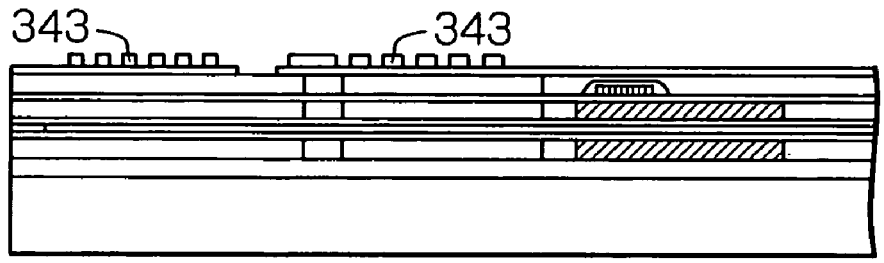

Next, as shown in FIG. 9a, a write gap layer 341 is formed of, for example, $Al_2O_3$, $SiO_2$, AlN or DLC, etc. with thickness of approximately 0.01 μm to 0.05 μm using, for example, a sputtering technique or a CVD technique. After that, a back-gap portion 47 is formed as a exposed portion of the lower magnetic pole layer 340 by removing a portion of the write gap layer 341 using, for example, a dry etching technique such as a milling technique or a reactive ion etching (RIE) with resist mask patterns. Then, as shown in FIG. 9b, the coil layer 343 is formed of, for example, Cu, etc. with thickness of approximately 1 μm to 5 μm deposited on the write gap layer 341 using, for example, a frame plating technique.

Figure 9C:
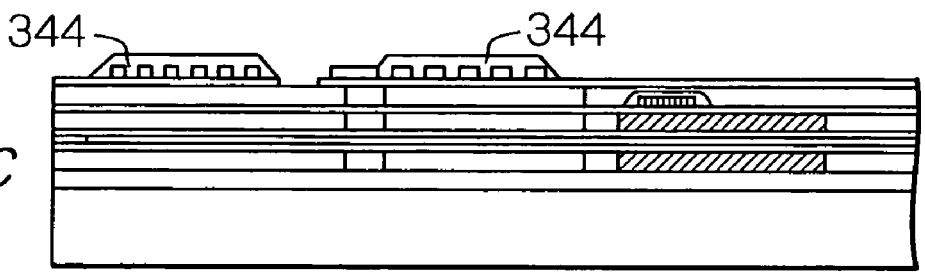
Figure 9D:
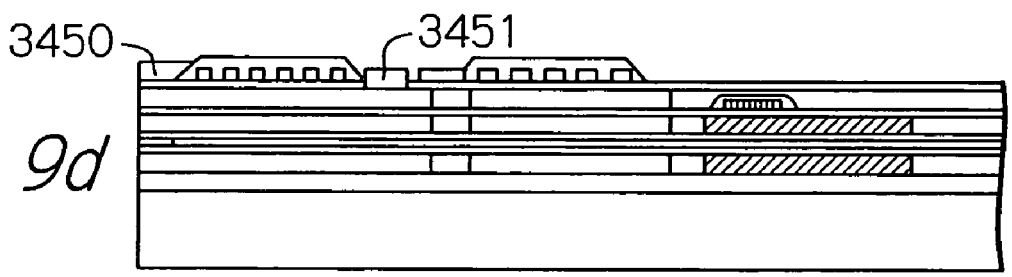

Next, as shown in FIG. 9c, a coil insulating layer 344 is formed of, for example, a heat-cured novolak resist with thickness of approximately 0.5 μm to 7 μm so as to cover the coil layer 343 using, for example, a photolithographic method. Then, as shown in FIG. 9d, an upper magnetic pole 3450 and a back-contact magnetic pole 3451 are formed of, for example, NiFe, CoFeNi, CoFe, FeN or FeZrN, or a multilayer of these alloys, etc. with thickness of approximately 0.5 μm to 3 μm deposited on the write gap layer 431 using, for example, a frame plating technique.

When the heating element 36 provided in a position with the same height in the stacking direction as the coil layer 343 instead of the position shown in FIG. 8g, a heating layer is formed at the same time as the coil layer 343 using, for example, a frame plating technique, and then, a heater insulating layer is formed at the same time as the coil insulating layer 344 so as to cover the heating layer using, for example, a photolithographic method. In this case, the number of manufacturing steps is reduced more than the case that the heating element 36 is provided in the position shown in FIG. 8g.

Figure 9E:
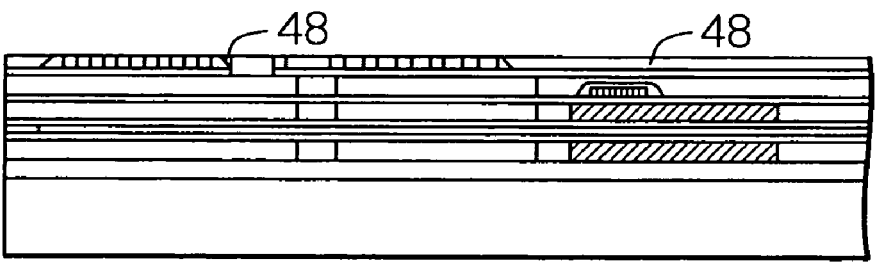
Figure 9F:
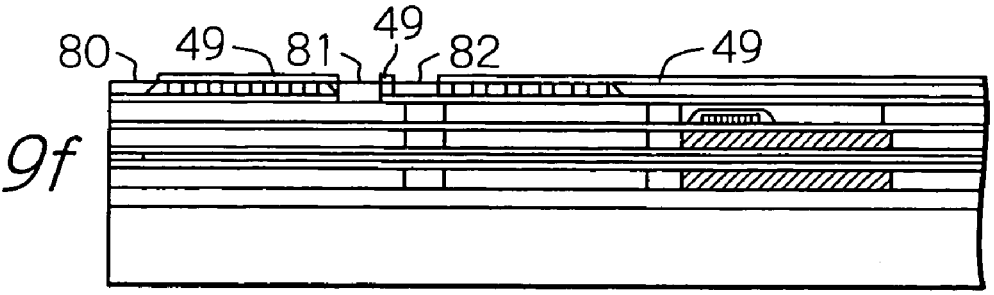

Next, as shown in FIG. 9e, a planarizing layer 48 is formed by depositing an insulating layer made of, for example, $Al_2O_3$ or $SiO_2$ with, for example, a sputtering technique and then planarizing the insulating film with a CMP technique. Then, as shown in FIG. 9f, an insulating layer 49 is formed of, for example, $Al_2O_3$ or $SiO_2$ using, for example, a sputtering technique or a CVD technique. After that, a portion 80 for connecting the upper magnetic pole and a yoke described later, a portion 81 for connecting the back-contact magnetic pole and the yoke and a coil lead portion 82 are formed by exposing portions of the lower layers using, for example, a dry etching technique such as a milling technique or a reactive ion etching (RIE) with resist mask patterns.

Figure 10A:
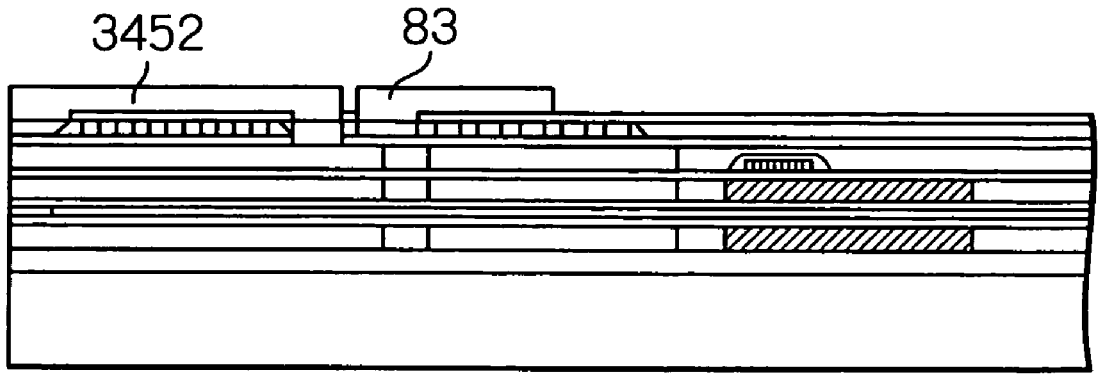

Next, as shown in FIG. 10a, the yoke layer 3452 and a coil lead layer 83 are formed of, for example, NiFe, CoFeNi, CoFe, FeN or FeZrN, or a multilayer of these alloys, etc. with thickness of approximately 0.5 μm to 3 μm using, for example, a frame plating technique. Here, the coil lead layer may also be formed of, for example, Cu, etc. using, for example, a frame plating technique in addition. After that, a trim milling process is performed to uniform the widths in the track-width direction of the ends opposed to each other through the write gap layer 341 of the upper magnetic pole 3450 and the lower magnetic pole layer 340. The formation of the upper magnetic pole layer 345 is completed through the above-described process for forming the upper magnetic pole 3450, the back-contact magnetic pole 3451 and the yoke layer 3452.

Figure 10B:
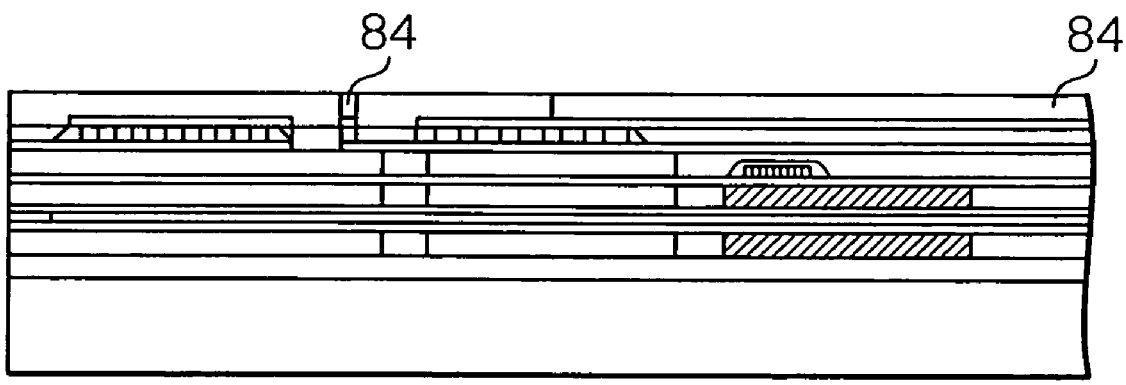
Figure 10C:
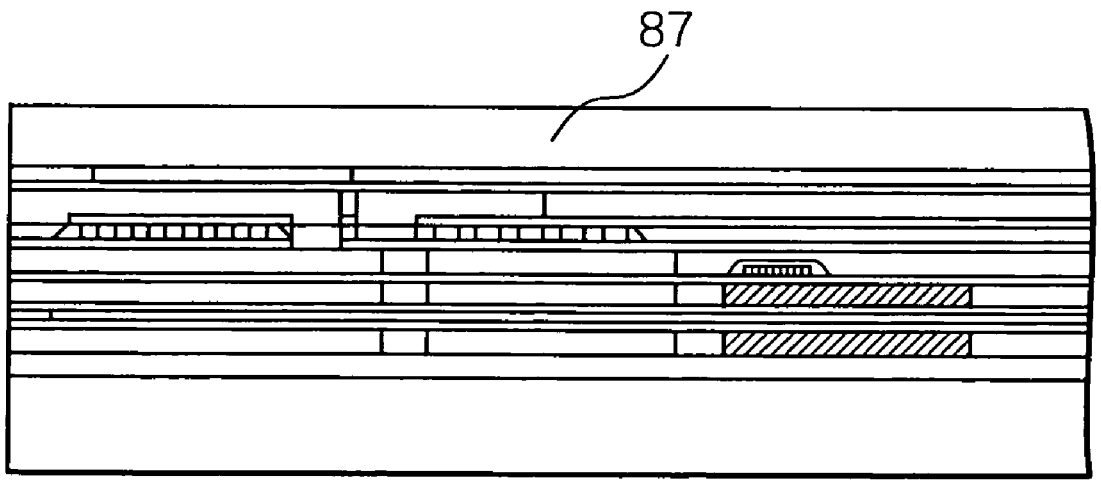

Next, as shown in FIG. 10b, a planarizing layer 84 is formed by depositing an insulating layer made of, for example, $Al_2O_3$ or $SiO_2$ with, for example, a sputtering technique and then planarizing the insulating film with a CMP technique. Then, as shown in FIG. 10c, the overcoat layer 87 is formed of, for example, $Al_2O_3$ or $SiO_2$ on the planarized surface using, for example, a sputtering technique.

Next, a wafer substrate as the slider substrate in which the above-described thin-film process is completed is cut into a plurality of low bars in which a plurality of the magnetic head elements is aligned. Then, an MR height process is performed to obtain a desired MR height by rapping the low bar. After that, the low bar that underwent the MR height process is separated by cutting into a plurality of sliders, and the manufacturing process of the thin-film magnetic head is completed.

The above-described manufacturing process is used for the thin-film magnetic head for longitudinal magnetic recording shown in FIG. 4a. However, alternatives or other processes with different conditions are also possible to be used. Further, the thin-film magnetic head for perpendicular magnetic recording shown in FIG. 4b can also be manufactured by applying the above-described process.

Figure 11:
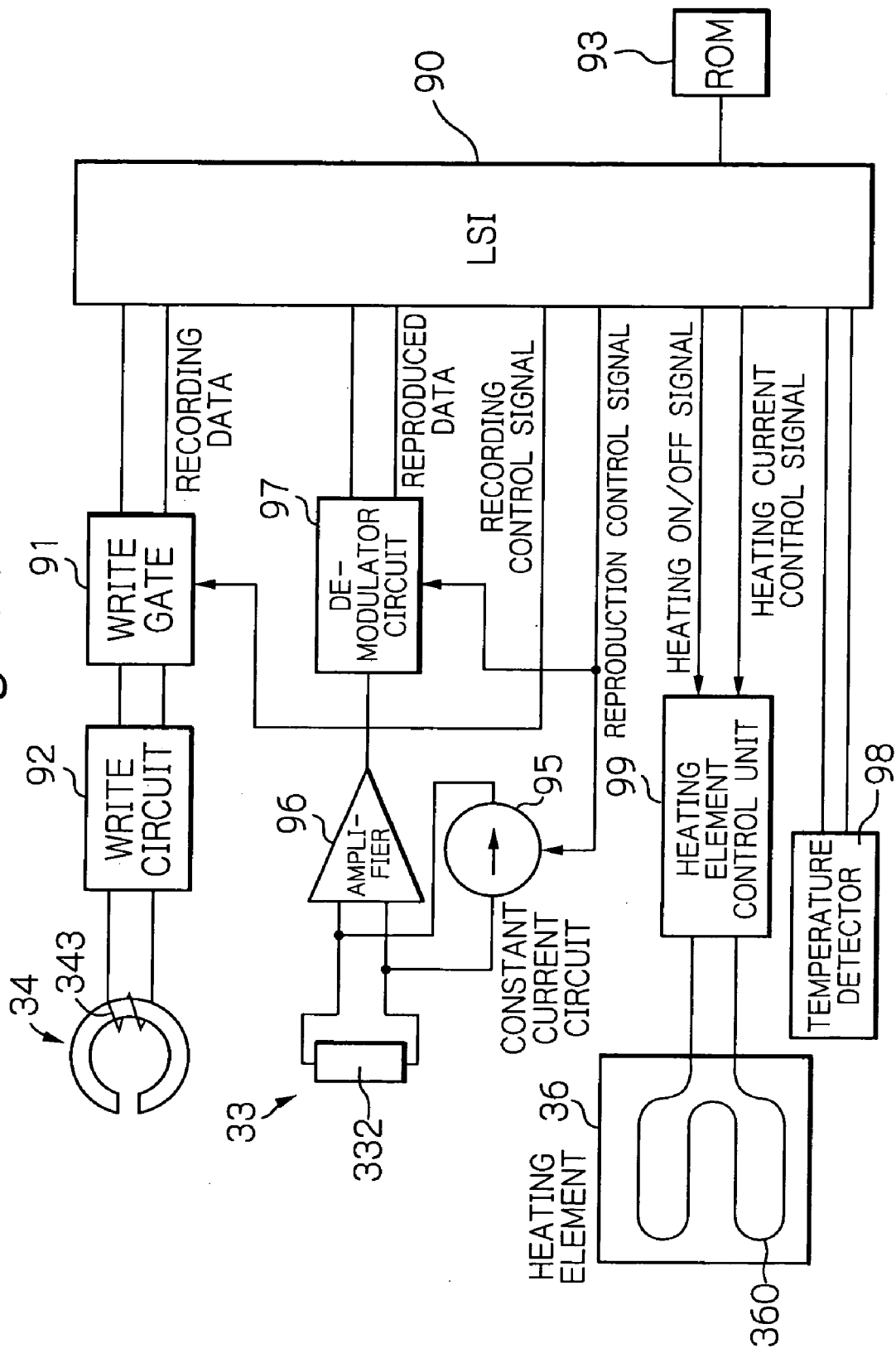
FIG. 11 shows a block diagram illustrating a circuit structure of the recording/reproducing and heating control circuit of the magnetic disk drive apparatus shown in FIG. 1.

FIG. 11 shows a block diagram illustrating a circuit structure of the recording/reproducing and heating control circuit 13 of the magnetic disk drive apparatus shown in FIG. 1.

In FIG. 11, reference numeral 90 indicates a recording/reproducing control LSI, 91 indicates a write gate that receives recording data from the recording/reproducing control LSI 90, 92 indicates a write circuit, 93 indicates a ROM that stores a table and so on for controlling current values applied to the heating element, 95 indicates a constant current circuit that supplies a sense current to the MR read head element 33, 96 indicates an amplifier that amplifies the output voltage of the MR read head element 33, 97 indicates a demodulator circuit that outputs reproduced data to the recording/reproducing control LSI 90, 98 indicates a temperature detector, and 99 indicates a heating element control unit for controlling the heating element 36, respectively.

The recording data that is output from the recording/reproducing control LSI 90 is supplied to the write gate 91. The write gate 91 supplies recording data to the write circuit 92 only when a recording control signal that is output from the recording/reproducing control LSI 90 instructs a write operation. The write circuit 92 passes a write current through the coil layer 343 corresponding to this recording data, and the inductive write head element 34 writes data on the magnetic disk.

A constant current flows from the constant current circuit 95 into the MR multilayer 332 only when the reproduction control signal that is output from the recording/reproducing control LSI 90 instructs a read operation. The signal reproduced by this MR read head element 33 is amplified by the amplifier 96 and demodulated by the demodulator circuit 97, and then, the obtained reproduced data is output to the recording/reproducing control LSI 90.

The heating element control unit 99 receives a heating ON/OFF signal and a heating current control signal that is output from the recording/reproducing control LSI 90. When the heating ON/OFF signal is an ON operation instruction, a current flows into the heating layer 360 of the heating element 36. The current value in this case is controlled to a value corresponding to the heating current control signal. The LSI 90 determines the values of the heating ON/OFF signal and the heating current control signal based on the state of write/read operations, the value of temperature measured by the temperature detector 98, and so on.

Thus, it is possible to utilize more diversified current application modes by providing the system of the heating ON/OFF signal and the heating current control signal, independently from the recording/reproducing control signal system.

It is obvious that the circuit structure of the recording/reproducing and heating control circuit 13 is not limited to that shown in FIG. 11. It is also possible to specify the write and read operations using a signal other than the recording/reproducing control signal. The heating by the heating element 36 is preferably performed during both writing and reading operations, however, the heating may also be performed only when either writing or reading, or only in a predetermined period. Furthermore, it is also possible to use not only direct current (DC) but also alternate current (AC) or pulse current, etc., as the current flowing through the heating element 36.

Hereinafter, the effect of providing the heater heatsink element in the thin-film magnetic head according to the present invention will be explained by disclosing some embodiments.

A Structure of an Embodiment 1

Figure 12A:
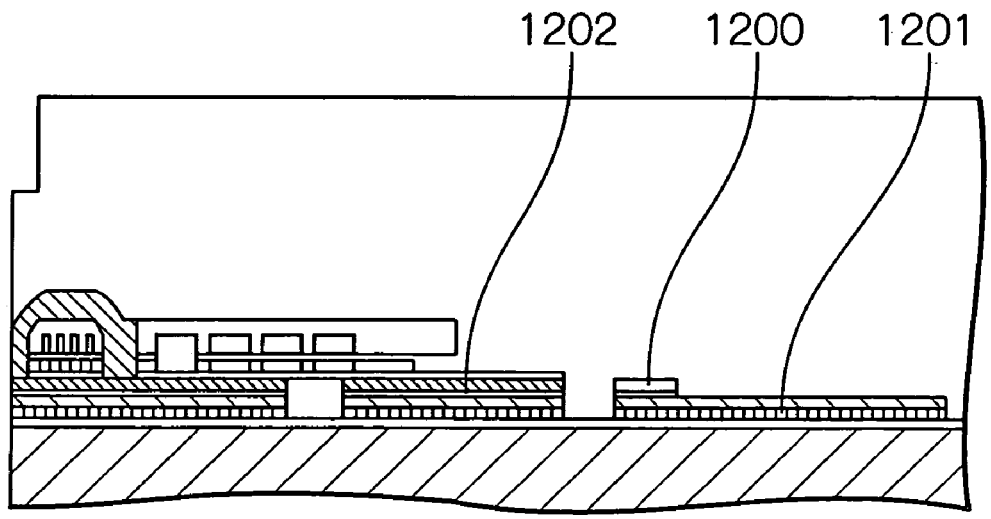
FIG. 12a shows a cross-sectional view illustrating a structure of a main part in a thin-film magnetic head of an embodiment 1 according to the present invention.
Figure 12B:
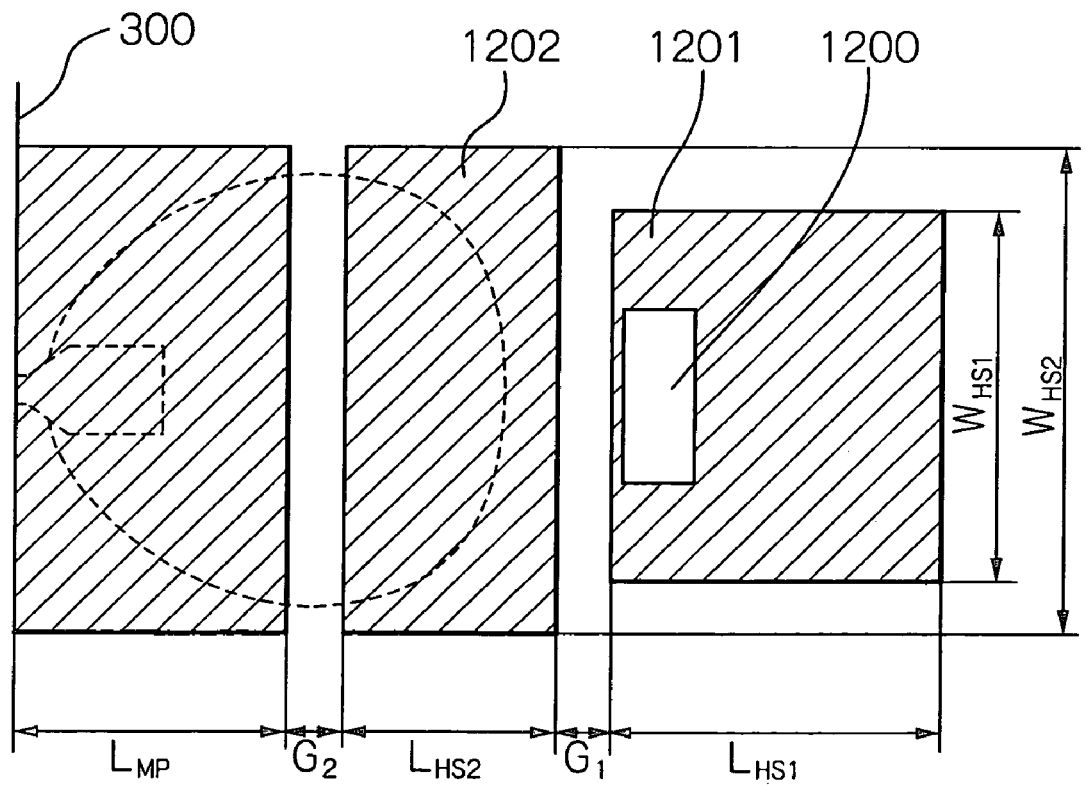
FIG. 12b shows a plain view explaining the size and position of a heater heatsink element in the thin-film magnetic head.

FIG. 12a shows a cross-sectional view illustrating a structure of a main part in a thin-film magnetic head of an embodiment 1 according to the present invention, and FIG. 12b shows a plain view explaining the size and position of a heater heatsink element in the thin-film magnetic head.

According to FIGS. 12a, the structure and configuration of a heating element 1200, a heater heatsink element (first heatsink element) 1201 and a coil heatsink element (second heatsink element) 1202 are almost the same as those of the embodiment shown in FIG. 4a. The heater heatsink element 1201 includes first and second heater heatsink layers as main layers. According to FIG. 12b, the heater heatsink element 1201 has a rectangular shape and a size of $W_{HS1}=90$ μm and $L_{HS1}=30$ μm, where the $W_{HS1}$ is a length of the shape in the track-width direction and the $L_{HS1}$ is a length of the shape in the direction perpendicular to the ABS (head end surface 300). The spacing $G_1$ between the heater heatsink element 1201 and the coil heatsink element 1202 is 5 μm, and the coil heatsink element 1202 has a size of $W_{HS2}=90$ μm and $L_{HS2}=20$ μm. Further, in the figure, $G_2=5$ μm and $L_{MP}=25$ μm.

A Structure of a Conventional Example

Figure 13A:
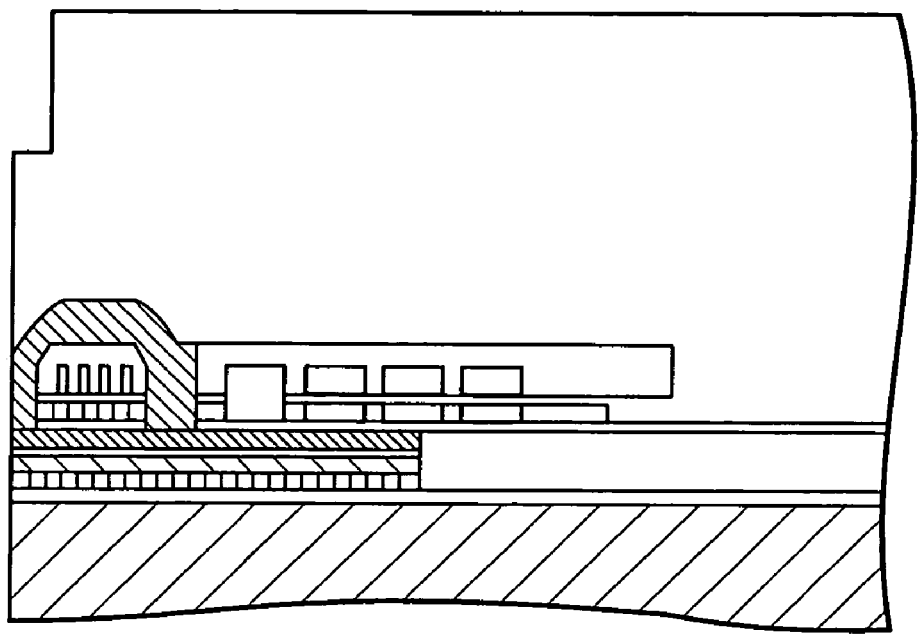
FIG. 13a shows a cross-sectional view illustrating a structure of a main part in a conventional thin-film magnetic head without heatsink elements.
Figure 13B:
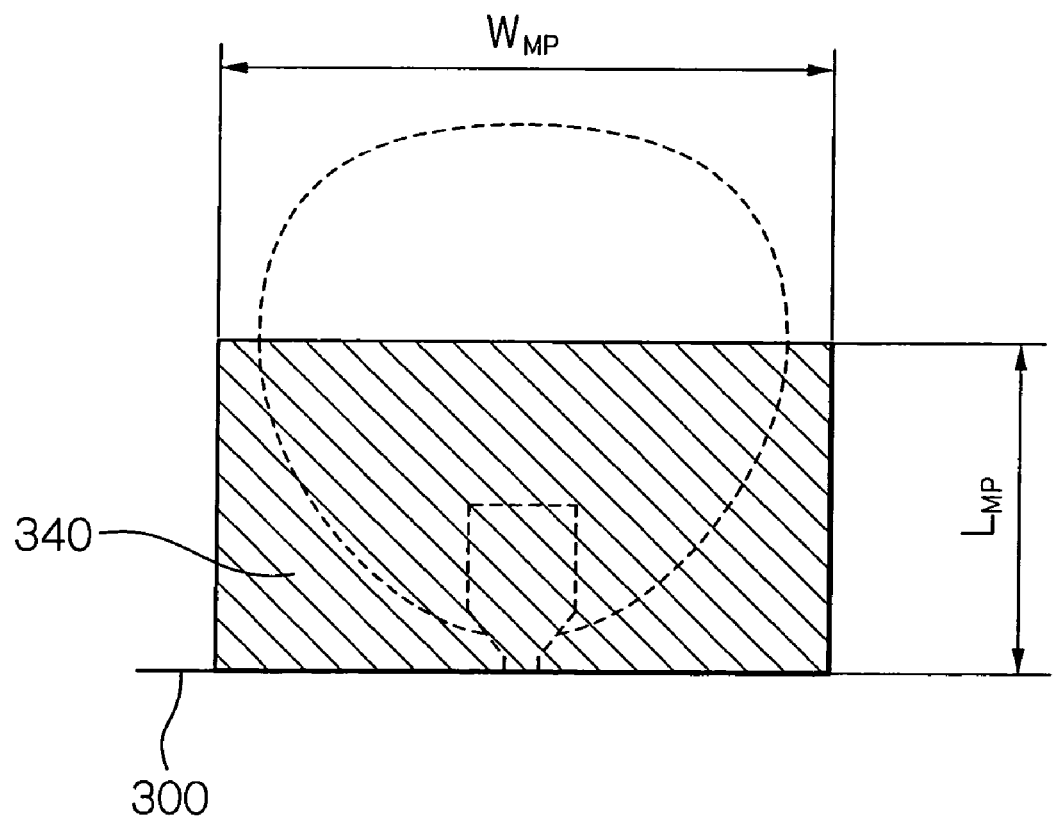

FIG. 13a shows a cross-sectional view illustrating a structure of a main part in a conventional thin-film magnetic head without heatsink elements, and FIG. 13b shows a plain view explaining the size of the structure.

According to FIGS. 13a, the conventional thin-film magnetic head has neither a heating element nor heatsink elements. According to FIG. 13b, the lower magnetic pole layer 340 has a size of $W_{MP}=90$ μm and $L_{MP}=25$ μm.

A Structure of a Comparative Example

Figure 14A:
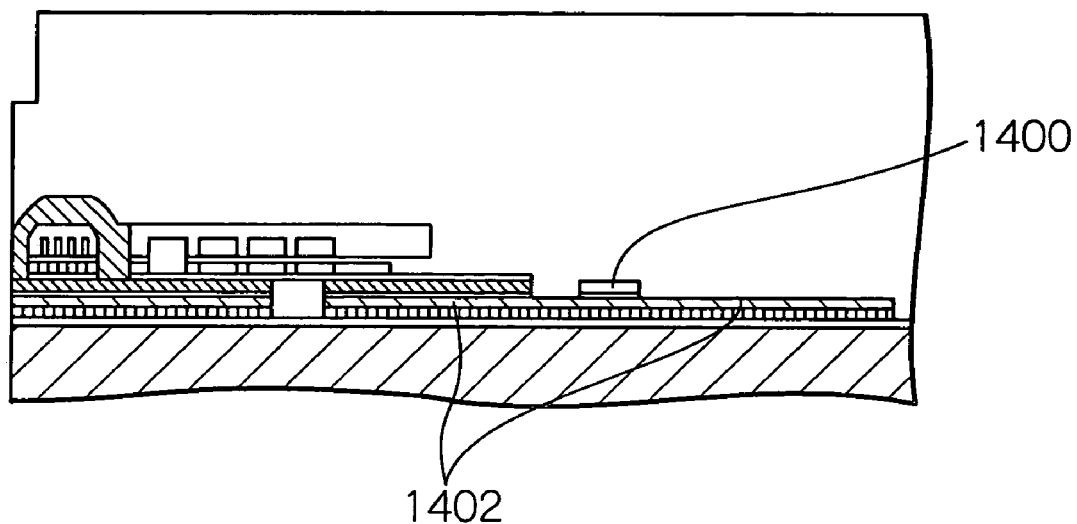
FIG. 14a shows a cross-sectional view illustrating a structure of a main part in a thin-film magnetic head only with a coil heatsink element as a comparative example.
Figure 14B:
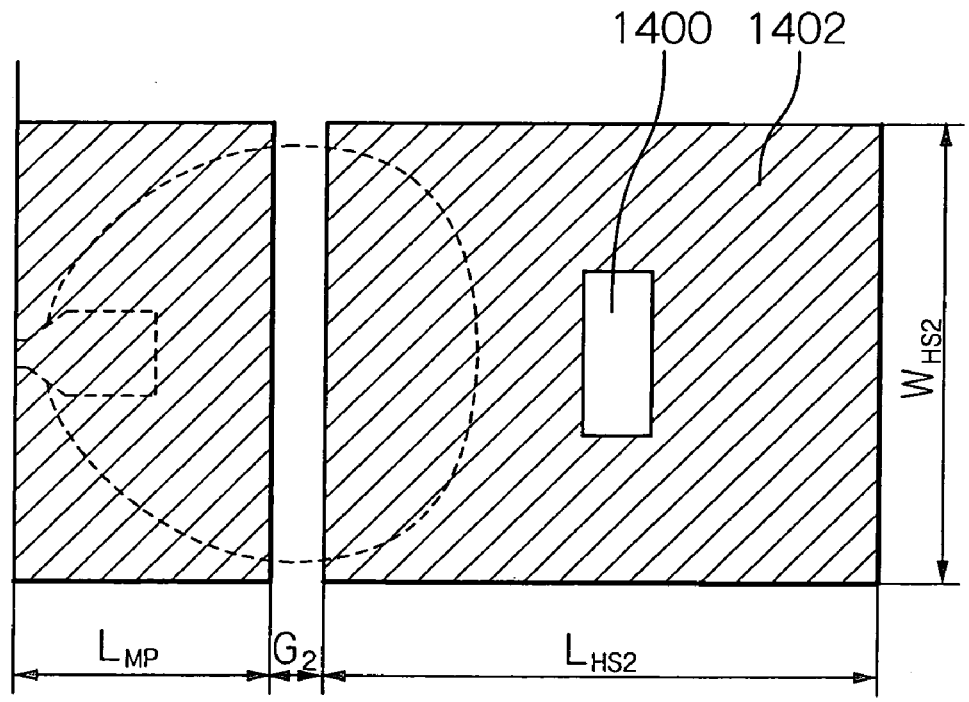

FIG. 14a shows a cross-sectional view illustrating a structure of a main part in a thin-film magnetic head only with a coil heatsink element as a comparative example, and FIG. 14b shows a plain view explaining the size and position of the coil heatsink element in the thin-film magnetic head.

According to FIGS. 14a, in the comparative example, the thin-film magnetic head has no heater heatsink element, and a multilayered coil heatsink element 1402 of the first and second layers is extended up to the region just below a heating element 1400 instead. According to FIG. 14b, the coil heatsink element 1402 has a size of $W_{HS2}=90$ μm and $L_{HS2}=20$ μm. Further, in the figure, $G_2=5$ μm and $L_{MP}=25$ μm.

The Conventional and Comparative Examples and the Embodiment 1

Hereinafter, the results of simulating the amount of temperature increase and the amount of protrusion in the thin film magnetic heads of the conventional and comparative examples and the embodiment 1 during heating operations will be explained.

Table 1 illustrates the results of the simulations of the temperature increase per power and the amount of protrusion per temperature in the conventional and comparative examples and the embodiment 1. In the simulations, the resistance value of the heating element was 100 ohm, and the applied power to the heating element was 100 mW. The amount of protrusion was determined as a protrusion value at a read gap between the upper and lower shield layers in the head end surface. Further, an operation environment was set in which the thin-film magnetic head flies opposed to the magnetic disk surface, and a part of the heat generated from the thin-film magnetic head is diffused toward the magnetic disk.

TABLE 1

| | Temperature increase per power (° C./mW) | | The amount of protrusion per temperature (nm/° C.) | |
|---|---|---|---|---|
| | MR multilayer | Heating element | MR multilayer | Heating element |
| Conventional ex. | 0.161 | 5.74 | 0.529 | 0.0148 |
| Comparative ex. | 0.156 | 0.96 | 0.483 | 0.0787 |
| Embodiment 1 | 0.135 | 1.39 | 0.518 | 0.0505 |

In the table, the temperature increase per power is defined as the amount of increase in temperature per the applied electric power of the MR multilayer or the heating element. The smaller the temperature increase per power is, the more the increase in temperature is suppressed. Further, the amount of protrusion per temperature is the increased amount of protrusion of the MR multilayer or the heating element when the temperature increases by 1° C. The larger the amount is, the larger amount of protrusion can be obtained even under suppressing the increase in temperature.

Figure 15:
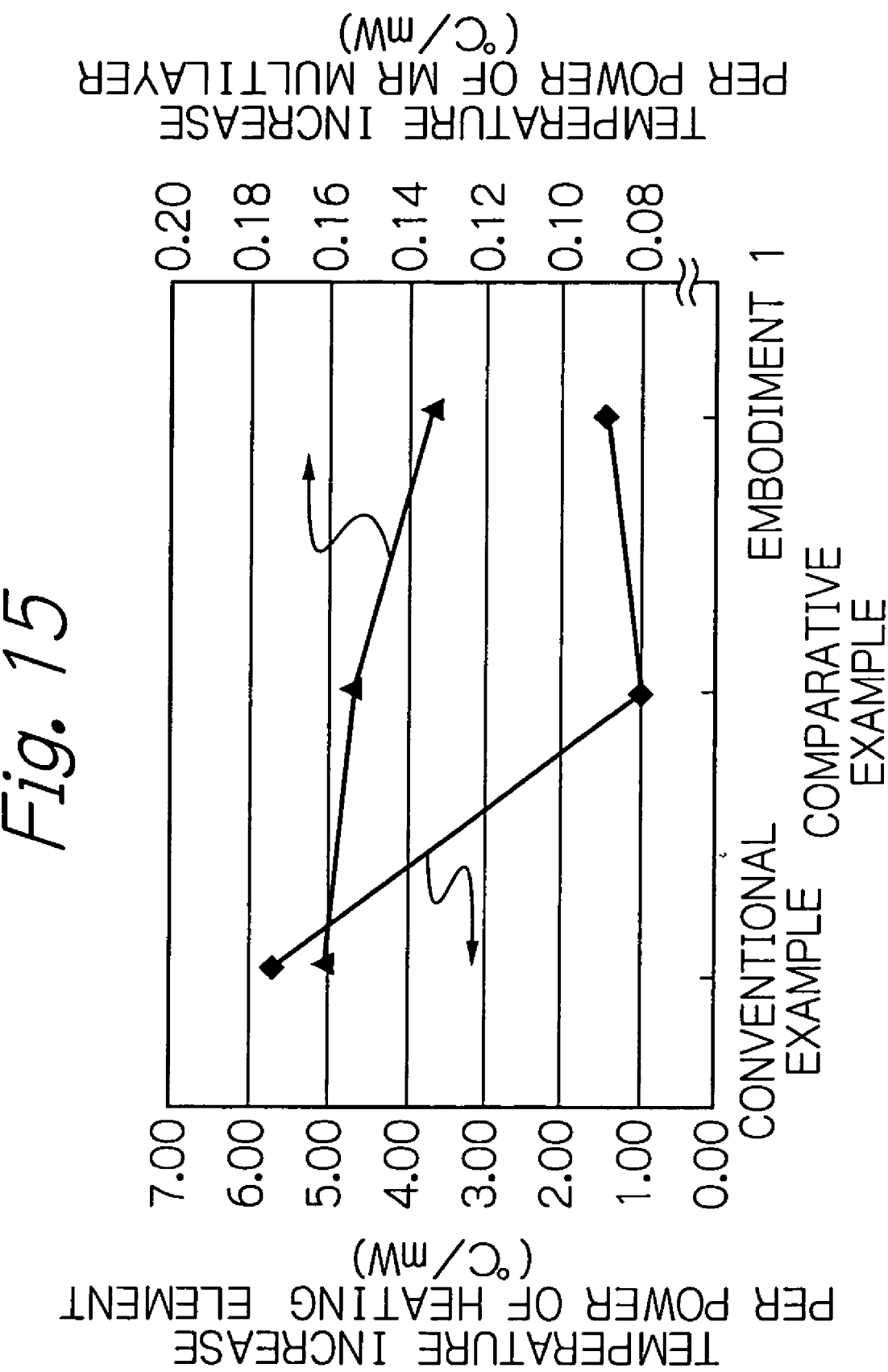
FIG. 15 shows a graph of the temperature increase per power of the MR multilayer and the heating element in the conventional and comparative examples and the embodiment 1 illustrated in table 1.

FIG. 15 shows a graph of the temperature increase per power of the MR multilayer and the heating element in the conventional and comparative examples and the embodiment 1 illustrated in table 1.

As shown in FIG. 15, it is noticed that the temperature increase per power of the MR multilayer becomes the smallest in the embodiment 1. Further, the temperature increase per power of the heating element becomes significantly smaller in the embodiment 1 and the comparative example compared to the conventional example. Therefore, it is clear that the increase in temperature of the MR multilayer as well as the heating element can be sufficiently suppressed by providing the heater heatsink element separated from the magnetic head element as is in the embodiment 1.

Figure 16:
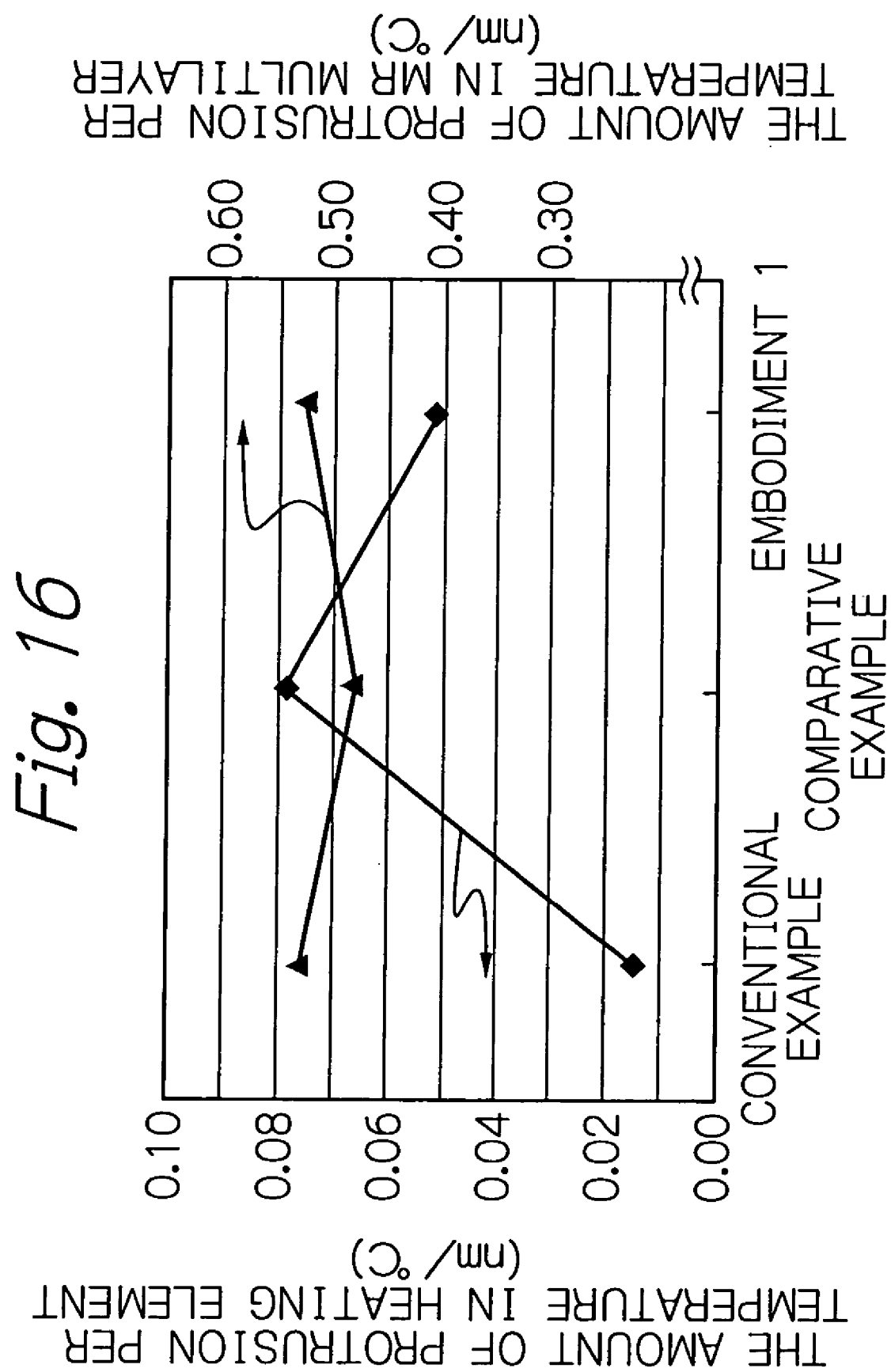
FIG. 16 shows a graph of the amount of protrusion per temperature of the MR multilayer and the heating element in the conventional and comparative examples and the embodiment 1 illustrated in table 1.

FIG. 16 shows a graph of the amount of protrusion per temperature of the MR multilayer and the heating element in the conventional and comparative examples and the embodiment 1 illustrated in table 1.

As shown in FIG. 16, it is noticed that the amount of protrusion per temperature of the heating element becomes more largely improved in the embodiment 1 and the comparative example compared to the conventional example. Whereas, the amount of protrusion per temperature of the MR multilayer becomes rather small in the comparative example, however, in the embodiment 1, is maintained to almost the same value as the conventional example. Therefore, it is clear that the larger amount of protrusion can be obtained by providing the heater heatsink element separated from the magnetic head element as is in the embodiment 1 even under suppressing the increase in temperature of the heating element and the MR multilayer.

Embodiments 2 and 3

Hereinafter, the results of simulating the amount of temperature increase and the amount of protrusion in various structures of the heater heatsink element will be explained.

Table 2 illustrates the results of the simulations of the temperature increase per power and the amount of protrusion per temperature in embodiments 2 and 3. The results of the embodiment 1 are also described in the table to facilitate comparisons of values. Here, the heater heatsink element of the embodiment 2 has a monolayered structure as shown in FIG. 5c, and the heater heatsink element of the embodiment 3 has a mainly three-layered structure of the first, second and third heater heatsink layers as shown in FIG. 5a. In the simulations, the resistance value of the heating element was 100 ohm, and the applied power to the heating element was 100 mW. The amount of protrusion was determined as a protrusion value at a read gap between the upper and lower shield layers in the head end surface. Further, an operation environment was set in which the thin-film magnetic head flies opposed to the magnetic disk surface, and a part of the heat generated from the thin-film magnetic head is diffused toward the magnetic disk.

TABLE 2

| | Temperature increase per power (° C./mW) | | The amount of protrusion per temperature (nm/° C.) | |
|---|---|---|---|---|
| | MR multilayer | Heating element | MR multilayer | Heating element |
| Conventional ex. | 0.161 | 5.74 | 0.529 | 0.0148 |
| Embodiment 1 | 0.135 | 1.39 | 0.518 | 0.0505 |
| Embodiment 2 | 0.149 | 4.44 | 0.526 | 0.0177 |
| Embodiment 3 | 0.132 | 1.24 | 0.532 | 0.0565 |

According to the table, it is noticed that the temperature increase per power of the MR multilayer and the heating element and the amount of protrusion per temperature of the heating element become improved in the embodiments 2 and 3 compared to the conventional example. The amount of protrusion per temperature of the MR multilayer has the same degree of value as the conventional example. Therefore, it is clear that the larger amount of protrusion can be obtained by providing the heater heatsink element separated from the magnetic head element as is in the embodiments 2 and 3 even under suppressing the increase in temperature of the heating element and the MR multilayer.

Figure 17A:
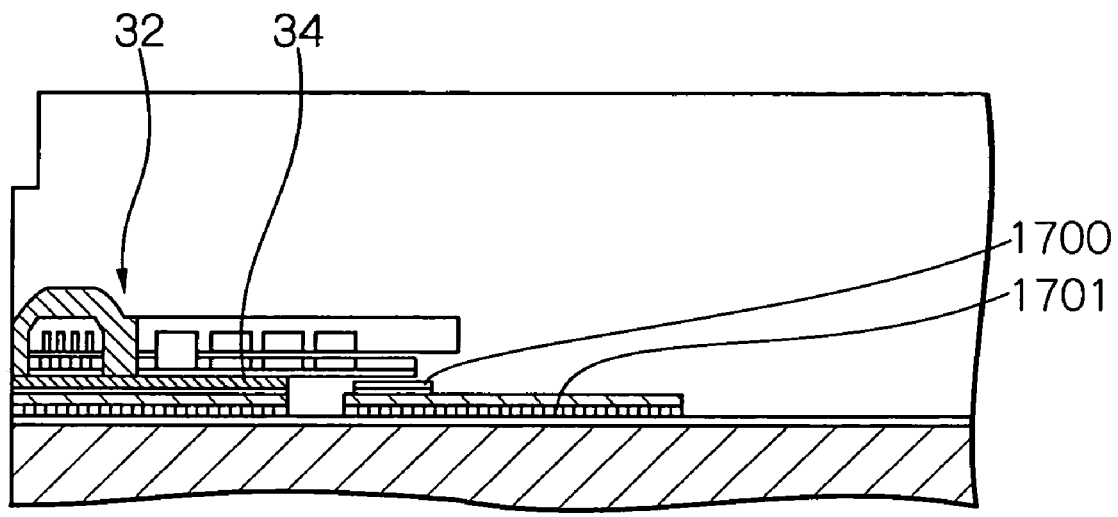
FIG. 17a shows a cross-sectional view illustrating a structure of a main part in other embodiments of the thin-film magnetic head.
Figure 17B:
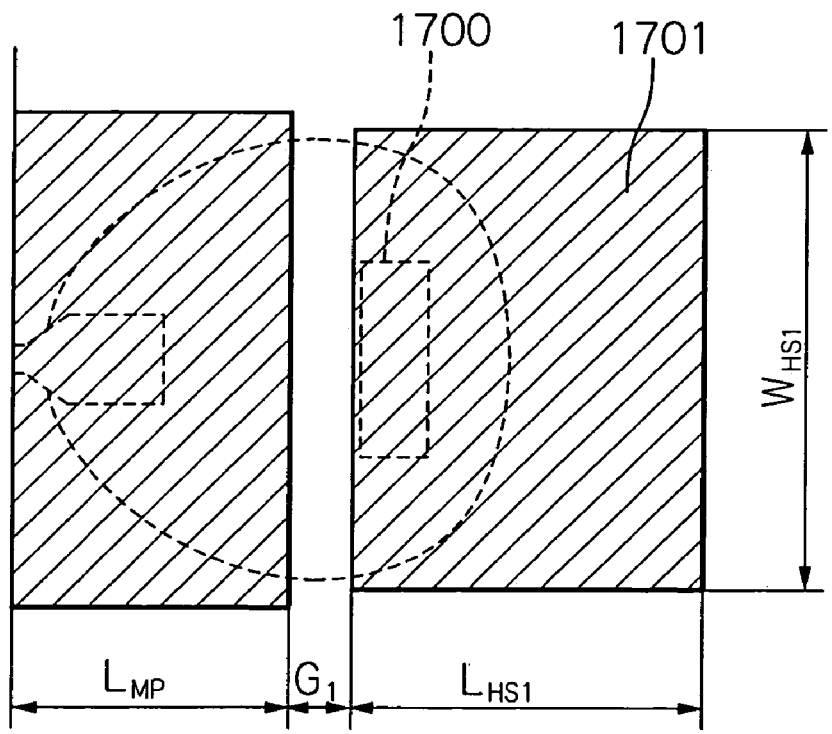
FIG. 17b shows a plain view explaining the size and position of the heater heatsink element in other embodiments.

As is obvious, different embodiments from the above-described ones may be in the scope of the present invention. FIG. 17a shows a cross-sectional view illustrating a structure of a main part in other embodiments of the thin-film magnetic head, and FIG. 17b shows a plain view explaining the size and position of the heater heatsink element in the embodiments.

According to FIG. 17a, a heating element 1700 and a heater heatsink element 1701 are provided adjacent to each other and separated with a predetermined distance from the magnetic head element 32. A coil heatsink element is not provided, and the heater heatsink element 1701 plays a role also of a heatsink for the inductive write head element 34. The heater heatsink element 1701 mainly has the first and second heater heatsink layers, however may also have only the first layer, or may further have a third layer, depending on the position of the heating element 1700.

Embodiments 1 and 4 to 7

Hereinafter, the results of simulating the amount of temperature increase and the amount of protrusion in the thin film magnetic heads with heater heatsink elements of various sizes (areas) will be explained.

The embodiments 4 to 7 have structures shown in FIGS. 12a and 12b as the embodiment 1, and have heater heatsink elements with sizes different from each other.

In the embodiments 4, 5 (and 1), the $W_{HS1}$ is the same value of 90 μm, however the $L_{HS1}$ is 11, 16 (and 30) μm respectively. In the embodiments 6, 7 (and 1), the $L_{HS1}$ is the same value of 30 μm, however the $W_{HS1}$ is 30, 50 (and 90) μm respectively. Further, in the embodiments 4 to 7 (and 1), the $G_2$=5 μm and the $L_{MP}$=25 μm.

Table 3 illustrates the results of the simulations of the temperature increase per power and the amount of protrusion per temperature in the embodiments 1 and 4 to 7. In the table, the results of the embodiment 1 are also illustrated, arranged twice respectively with the embodiments 4 and 5 and the embodiments 6 and 7 in the table to facilitate comparisons of values. In the simulations, the resistance value of the heating element was 100 ohm, and the applied power to the heating element is 100 mW. The amount of protrusion is determined as a protrusion value at a read gap between the upper and lower shield layers in the head end surface. Further, an operation environment was set, in which the thin-film magnetic head flies opposed to the magnetic disk surface, and a part of the heat generated from the thin-film magnetic head is diffused toward the magnetic disk.

TABLE 3

| | $W_{HS1}$ | | Temperature increase per power (° C./mW) | | The amount of protrusion per temperature (nm/° C.) | |
|---|---|---|---|---|---|---|
| | (μm) × $L_{HS1}$ (μm) | Area (μm²) | MR multilayer | Heating element | MR multilayer | Heating element |
| Em. 4 | 90 × 11 | 990 | 0.140 | 1.472 | 0.518 | 0.049 |
| Em. 5 | 90 × 16 | 1440 | 0.137 | 1.407 | 0.519 | 0.051 |
| Em. 1 | 90 × 30 | 2700 | 0.135 | 1.391 | 0.518 | 0.050 |
| Em. 6 | 30 × 30 | 900 | 0.142 | 1.483 | 0.507 | 0.049 |
| Em. 7 | 50 × 30 | 1500 | 0.140 | 1.431 | 0.511 | 0.050 |
| Em. 1 | 90 × 30 | 2700 | 0.135 | 1.391 | 0.518 | 0.050 |

Figure 18A:
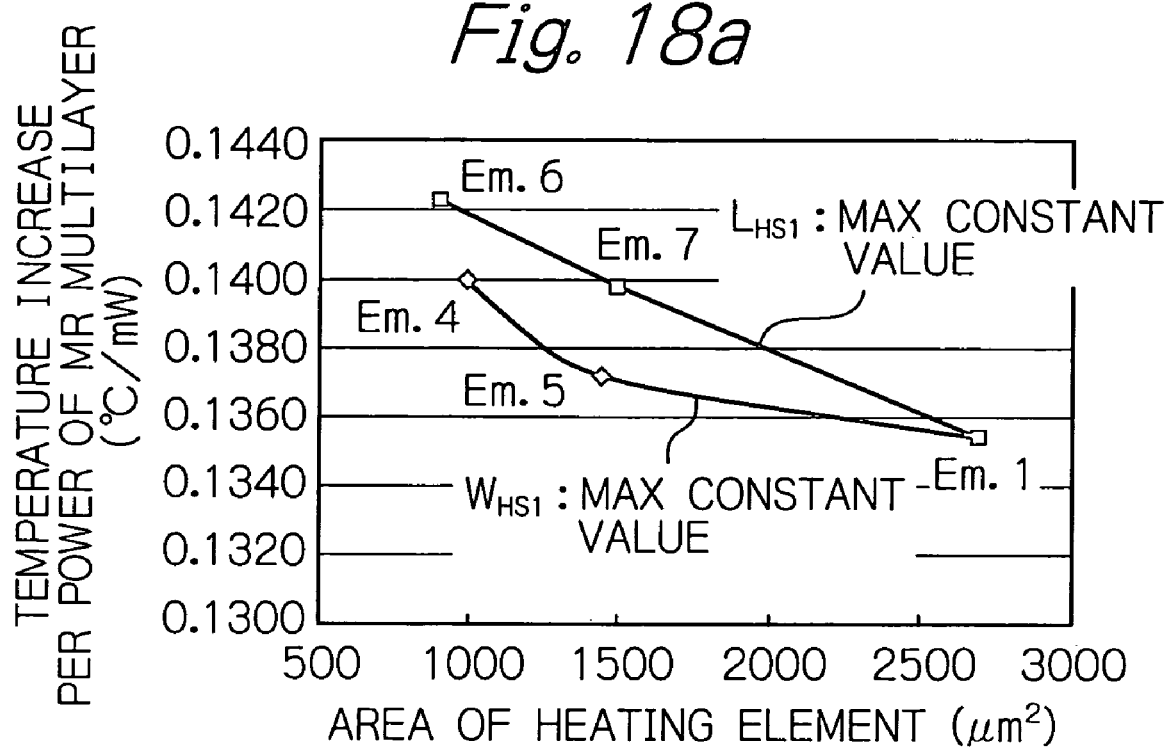
FIG. 18a shows a graph of the temperature increase per power of the MR multiplayer in these embodiments illustrated in table 3.
Figure 18B:
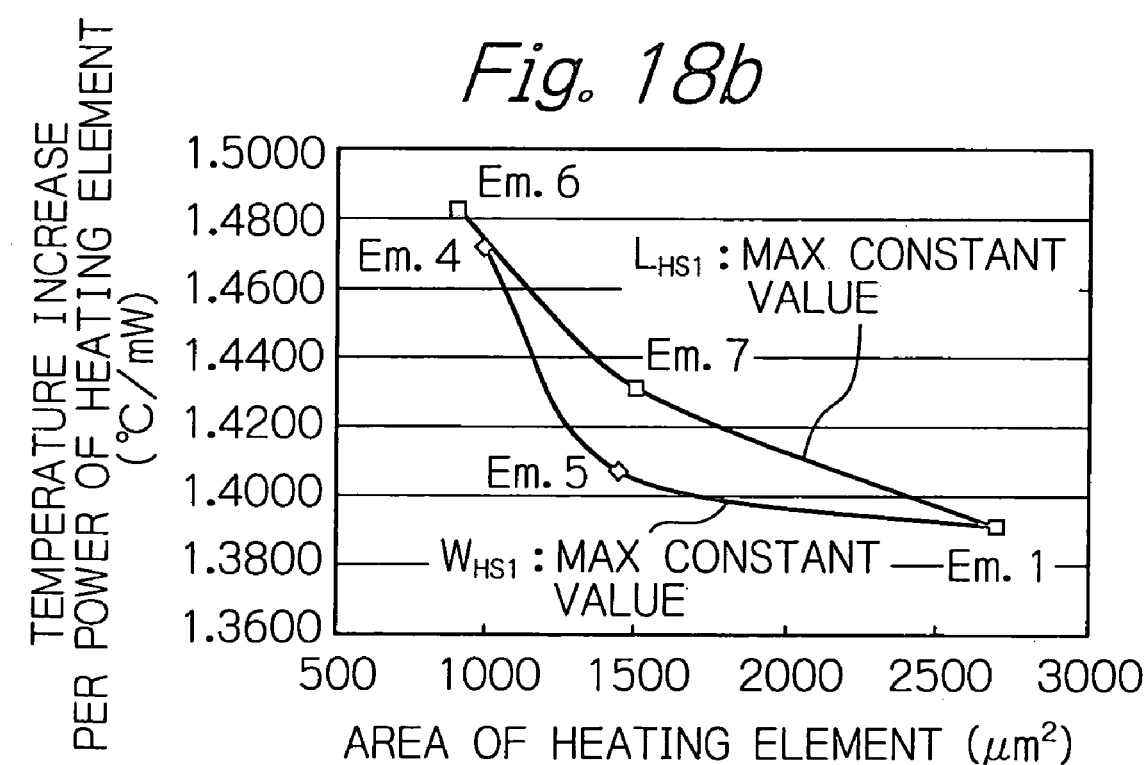
FIG. 18b shows a graph of the temperature increase per power of the heating element in these embodiments illustrated in table 3.

FIG. 18a shows a graph of the temperature increase per power of the MR multiplayer in these embodiments illustrated in table 3, and FIG. 18b shows a graph of the temperature increase per power of the heating element in these embodiments illustrated in table 3. In these graphs, the horizontal axis is an area of the heating element. Therefore, the comparison of the temperature increase per power between samples with the same area of the heating element is facilitated.

As shown in FIG. 18a, it is noticed that the temperature increase per power of the MR multilayer on a curve shaped through the data points of the embodiments 4, 5 and 1 with a constant maximum value of $W_{HS1}$=90 μm, becomes smaller than that on a curve shaped through the data points of the embodiments 6, 7 and 1 with smaller values of $W_{HS1}$, at the same value of the area. Here, as illustrated in Table 3, the value of $W_{HS1}$ in the embodiments 4, 5 and 1 becomes at least three times larger than the value of $L_{HS1}$. Whereas, the value of $W_{HS1}$ in the embodiments 6, 7 and 1 becomes the same as or larger than the value of the $L_{HS1}$, however becomes smaller than the triple value of $L_{HS1}$. Therefore, when the heating element with the same area but the larger $W_{HS1}$ is used, the temperature increase per power of the MR multilayer is more suppressed. Further, as shown in FIG. 18b, the temperature increase per power of the heating element has the same tendency as that of the MR multilayer just-described. Therefore, when the heating element with the same area but the larger $W_{HS1}$ is used, the temperature increase per power of the heating element itself is also more suppressed.

Figure 19A:
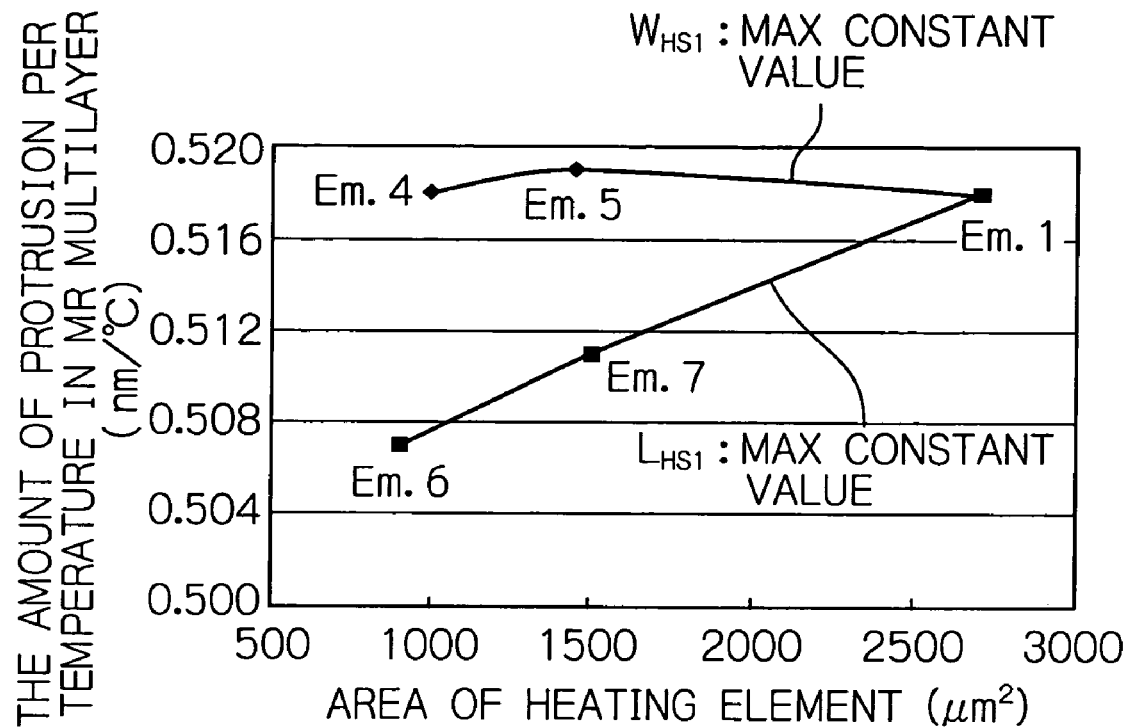
FIG. 19a shows a graph of the amount of protrusion per temperature of the MR multilayer in the embodiments illustrated in table 3.
Figure 19B:
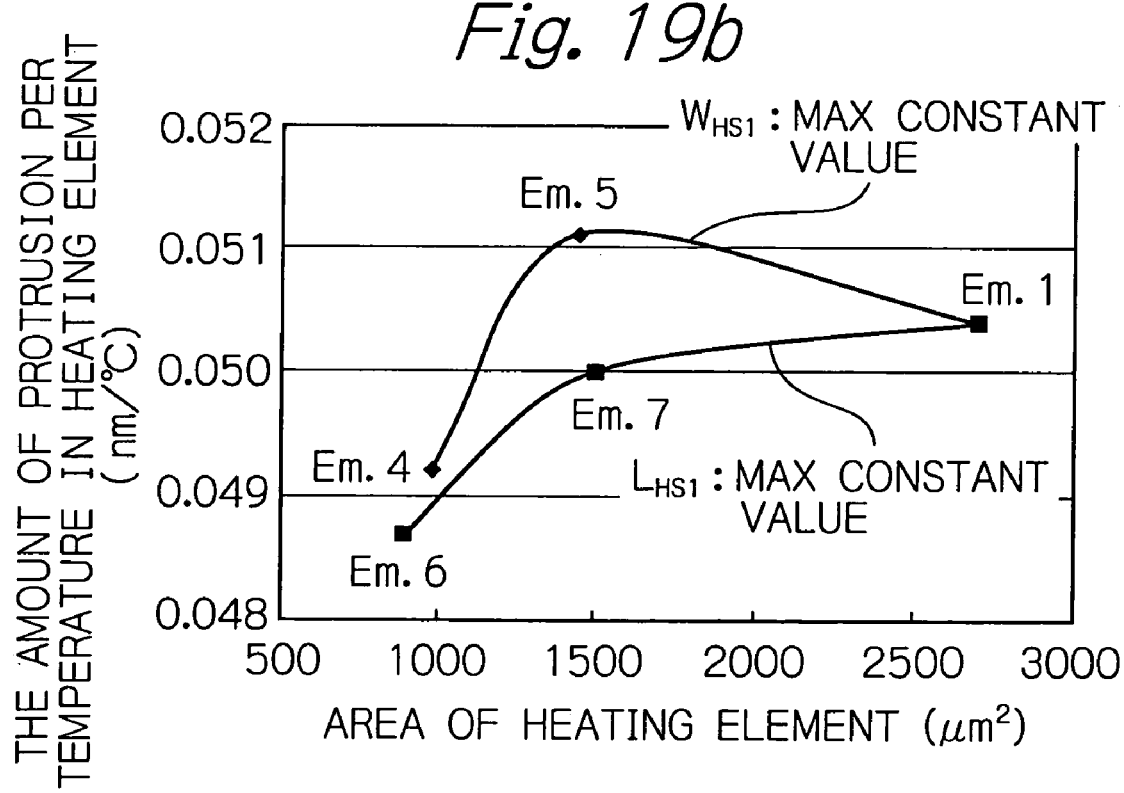
FIG. 19b shows a graph of the amount of protrusion per temperature of the heating element in the embodiments illustrated in table 3.

FIG. 19a shows a graph of the amount of protrusion per temperature of the MR multilayer in the embodiments illustrated in table 3, and FIG. 19b shows a graph of the amount of protrusion per temperature of the heating element in the embodiments illustrated in table 3.

As shown in FIG. 19a, it is noticed that the amount of protrusion per temperature of the MR multilayer on a curve shaped through the data points of the embodiments 4, 5 and 1 with a constant maximum value of $W_{HS1}$=90 µm, becomes larger than that on a curve shaped through the data points of the embodiments 6, 7 and 1 with smaller values of $W_{HS1}$, at the same value of the area. Here, as illustrated in Table 3, the value of $W_{HS1}$ in the embodiments 4, 5 and 1 becomes at least three times larger than the value of $L_{HS1}$. Whereas, the value of $W_{HS1}$ in the embodiments 6, 7 and 1 becomes the same as or larger than the value of $L_{HS1}$, however becomes smaller than the triple value of the $L_{HS1}$. Therefore, when the heating element with the same area but the larger $W_{HS1}$ is used, the amount of protrusion per temperature is more improved. Further, as shown in FIG. 19b, the amount of protrusion per temperature of the heating element has the same tendency as that of the MR multilayer just-described. Therefore, when the heating element with the same area but the larger $W_{HS1}$ is used, the amount of protrusion per temperature of the heating element itself is also more improved.

As the results shown in FIGS. 18a and 18b and FIGS. 19a and 19b, it is understood that the protrusion efficiency of the magnetic head element is more improved even under further suppressing the increase in temperature of the MR read head element by making the width of the heater heatsink element wider.

All the foregoing embodiments including the embodiments 1 to 7, especially, the sizes of the heater heatsink elements, are by way of example of the present invention only, and not intended to be limiting. The excessively large heater heatsink element causes the amount of protrusion per applied power (nm/mW) to be significantly decreased. On the contrary, the excessively small heater heatsink element causes the temperature increase per power (° C./mW) to be significantly increased. Therefore, it is preferable that the size of the heater heatsink element is designed so that the amount of protrusion per temperature (nm/° C.), which is the amount of protrusion per power divided by the temperature increase per power, becomes the same as or larger than a predetermined value. Further, it is preferably took into account that the upper limit of the temperature increase required for ensuring the reliability by preventing failures such as a disconnection, is dependent on the size, the shape and the constituent material of the heating element.

Further, many widely different alternations and modifications of the present invention may be constructed without departing from the spirit and scope of the present invention. Accordingly, the present invention is limited only as defined in the following claims and equivalents thereto.

The invention claimed is:

1. A thin-film magnetic head comprising:
at least one magnetic head element for writing and/or reading data signals;
at least one heating element for generating heat at least during operations of said at least one magnetic head element; and
at least one first heatsink element provided adjacent to said at least one heating element for receiving a part of the heat generated from said at least one heating element,
said at least one first heatsink element being a distance from said at least one magnetic head element, and
said at least one magnetic head element comprising:
an inductive write head element; and
at least one second heatsink element provided adjacent to said inductive write head element for receiving a part of the heat generated from said inductive write head element.

2. The thin-film magnetic head as claimed in claim 1, wherein said at least one magnetic head element comprises an inductive write head element, and said at least one first heatsink element is provided in a position where said at least one first heatsink element can receive a part of the heat generated from said inductive write head element.

3. The thin-film magnetic head as claimed in claim 1, wherein said at least one first heatsink element has a rectangular shape with a predetermined area, and a length in track-width direction of said rectangular shape is larger than a length in perpendicular direction to an air bearing surface of said rectangular shape.

4. The thin-film magnetic head as claimed in claim 1, wherein said at least one first heatsink element is provided opposite to the air bearing surface in relation to said at least one magnetic head element.

5. The thin-film magnetic head as claimed in claim 1, wherein said at least one magnetic head element comprises an magnetoresistive read head element comprising a lower shield layer and an upper shield layer, and said at least one first heatsink element is provided in a position with the same or almost the same height in the stacking direction as said lower shield layer or said upper shield layer.

6. The thin-film magnetic head as claimed in claim 5, wherein said magnetoresistive read head element is a giant magnetoresistive read head element.

7. The thin-film magnetic head as claimed in claim 5, wherein said at least one first heatsink element comprises a single heatsink layer or a multilayer of a plurality of heatsink layers with/without intercalated insulating layer, and said single heatsink layer or each of said heatsink layers is formed of the same material as one of said lower shield layer, said upper shield layer and a plurality of magnetic pole layers of said inductive write head element.

8. The thin-film magnetic head as claimed in claim 1, wherein said at least one first heatsink element is provided above said at least one heating element.

9. The thin-film magnetic head as claimed in claim 1, wherein said at least one first heatsink element is provided below said at least one heating element.

10. The thin-film magnetic head as claimed in claim 1, wherein each of said at least one first heatsink element and said at least one heating element has a plane-symmetric shape, and each symmetry plane of the shape is lying in plane with a symmetry plane perpendicular to the air bearing surface of said at least one magnetic head element.

11. The thin-film magnetic head as claimed in claim 1, wherein said at least one magnetic head element comprises an inductive write head element for longitudinal magnetic recording or for perpendicular magnetic recording.

12. A head gimbal assembly comprising a thin-film magnetic head comprising:
  at least one magnetic head element for writing and/or reading data signals;
  at least one heating element for generating heat at least during operations of said at least one magnetic head element; and
  at least one first heatsink element provided adjacent to said at least one heating element for receiving a part of the heat generated from said at least one heating element,
  said at least one first heatsink element being a distance from said at least one magnetic head element,
  said at least one magnetic head element comprising:
  an inductive write head element; and
  at least one second heatsink element provided adjacent to said inductive write head element for receiving a part of the heat generated from said inductive write head element; and
  said head gimbal assembly further comprising:
  first trace conductors of said at least one magnetic head element;
  second trace conductors for supplying currents to said at least one heating element; and
  a support structure for supporting said thin-film magnetic head.

13. The head gimbal assembly as claimed in claim 12, wherein said at least one magnetic head element comprises an inductive write head element, and said at least one first heatsink element is provided in a position where said at least one first heatsink element can receive a part of the heat generated from said inductive write head element.

14. The head gimbal assembly as claimed in claim 12, wherein said at least one first heatsink element has a rectangular shape with a predetermined area, and a length in track-width direction of said rectangular shape is larger than a length in perpendicular direction to an air bearing surface of said rectangular shape.

15. The head gimbal assembly as claimed in claim 12, wherein said at least one first heatsink element is provided opposite to the air bearing surface in relation to said at least one magnetic head element 16. The head gimbal assembly as claimed in claim 12, wherein said at least one magnetic head element comprises an magnetoresistive read head element comprising a lower shield layer and an upper shield layer, and said at least one first heatsink element is provided in a position with the same or almost the same height in the stacking direction as said lower shield layer or said upper shield layer.

17. The head gimbal assembly as claimed in claim 16, wherein said magnetoresistive read head element is a giant magnetoresistive read head element.

18. The head gimbal assembly as claimed in claim 16, wherein said at least one first heatsink element comprises a single heatsink layer or a multilayer of a plurality of heatsink layers with/without intercalated insulating layer, and said single heatsink layer or each of said heatsink layers is formed of the same material as one of said lower shield layer, said upper shield layer and a plurality of magnetic pole layers of said inductive write head element.

19. The head gimbal assembly as claimed in claim 12, wherein said at least one first heatsink element is provided above said at least one heating element.

20. The head gimbal assembly as claimed in claim 12, wherein said at least one first heatsink element is provided below said at least one heating element.

21. The head gimbal assembly as claimed in claim 12, wherein each of said at least one first heatsink element and said at least one heating element has a plane-symmetric shape, and each symmetry plane of the shape is lying in plane with a symmetry plane perpendicular to the air bearing surface of said at least one magnetic head element.

22. The head gimbal assembly as claimed in claim 12, wherein said at least one magnetic head element comprises an inductive write head element for longitudinal magnetic recording or for perpendicular magnetic recording.

23. A magnetic disk drive apparatus comprising at least one head gimbal assembly comprising a thin-film magnetic head comprising:
  at least one magnetic head element for writing and/or reading data signals;
  at least one heating element for generating heat at least during operations of said at least one magnetic head element; and
  at least one first heatsink element provided adjacent to said at least one heating element for receiving a part of the heat generated from said at least one heating element,
  said at least one first heatsink element being a distance from said at least one magnetic head element,
  said at least one magnetic head element comprising:
  an inductive write head element; and
  at least one second heatsink element provided adjacent to said inductive write head element for receiving a part of the heat generated from said inductive write head element;
  said head gimbal assembly further comprising:
  first trace conductors of said at least one magnetic head element;
  second trace conductors for supplying currents to said at least one heating element; and
  a support structure for supporting said thin-film magnetic head, and
  said magnetic disc drive apparatus further comprising:
  at least one magnetic disk; and
  a recording/reproducing and heating control means for controlling read and write operations of said thin-film magnetic head to said at least one magnetic disk and for controlling currents supplied to said at least one heating element.

24. The magnetic disk drive apparatus as claimed in claim 23, wherein said at least one magnetic head element comprises an inductive write head element, and said at least one first heatsink element is provided in a position where said at least one first heatsink element can receive a part of the heat generated from said inductive write head element.

25. The magnetic disk drive apparatus as claimed in claim 23, wherein said at least one first heatsink element has a rectangular shape with a predetermined area, and a length in track-width direction of said rectangular shape is larger than a length in perpendicular direction to an air bearing surface of said rectangular shape.

26. The magnetic disk drive apparatus as claimed in claim 23, wherein said at least one first heatsink element is provided opposite to the air bearing surface in relation to said at least one magnetic head element.

27. The magnetic disk drive apparatus as claimed in claim 23, wherein said at least one magnetic head element comprises an magnetoresistive read head element comprising a lower shield layer and an upper shield layer, and said at least one first heatsink element is provided in a position with the same or almost the same height in the stacking direction as said lower shield layer or said upper shield layer.

28. The magnetic disk drive apparatus as claimed in claim 27, wherein said magnetoresistive read head element is a giant magnetoresistive read head element.

29. The magnetic disk drive apparatus as claimed in claim 27, wherein said at least one first heatsink element comprises a single heatsink layer or a multilayer of a plurality of heatsink layers with/without intercalated insulating layer, and said single heatsink layer or each of said heatsink layers is formed of the same material as one of said lower shield layer, said upper shield layer and a plurality of magnetic pole layers of said inductive write head element.

30. The magnetic disk drive apparatus as claimed in claim 23, wherein said at least one first heatsink element is provided above said at least one heating element.

31. The magnetic disk drive apparatus as claimed in claim 23, wherein said at least one first heatsink element is provided below said at least one heating element.

32. The magnetic disk drive apparatus as claimed in claim 23, wherein each of said at least one first heatsink element and said at least one heating element has a plane-symmetric shape, and each symmetry plane of the shape is lying in plane with a symmetry plane perpendicular to the air bearing surface of said at least one magnetic head element.

33. The magnetic disk drive apparatus as claimed in claim 23, wherein said at least one magnetic head element comprises an inductive write head element for longitudinal magnetic recording or for perpendicular magnetic recording.

* * * * *